United States Patent
Kurachi et al.

[11] Patent Number: 6,066,442
[45] Date of Patent: *May 23, 2000

[54] PLASTIC FILM HAVING AN IMPROVED ANTI-STATIC PROPERTY

[75] Inventors: Yasuo Kurachi; Hidetoshi Ezure; Takayuki Sasaki; Masayoshi Yamauchi; Hitoshi Adachi; Eiichi Ueda; Yasuhiko Takamuki, all of Tokyo, Japan

[73] Assignee: Konica Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/734,686

[22] Filed: Oct. 21, 1996

[30] Foreign Application Priority Data

| Oct. 23, 1995 | [JP] | Japan | 7-274284 |
| Oct. 25, 1995 | [JP] | Japan | 7-277659 |
| Oct. 25, 1995 | [JP] | Japan | 7-277660 |
| Oct. 26, 1995 | [JP] | Japan | 7-279058 |

[51] Int. Cl.⁷ ..................... G03C 1/89
[52] U.S. Cl. ............ 430/530; 430/527; 428/702; 252/518; 252/500; 260/DIG. 16
[58] Field of Search ................... 430/527, 530, 430/529, 536, 528; 428/702; 252/518, 500; 260/DIG. 16

[56] References Cited

U.S. PATENT DOCUMENTS

| 5,188,930 | 2/1993 | Funaki et al. | 430/536 |
| 5,340,676 | 8/1994 | Anderson et al. | 430/527 |
| 5,368,995 | 11/1994 | Christian et al. | 430/530 |
| 5,372,923 | 12/1994 | Kurachi et al. | 430/527 |
| 5,453,350 | 9/1995 | Kurachi et al. | 430/527 |
| 5,466,567 | 11/1995 | Anderson et al. | 430/527 |
| 5,582,964 | 12/1996 | Hashimoto et al. | 430/536 |
| 5,609,969 | 3/1997 | Clatanoff et al. | 430/527 |
| 5,618,661 | 4/1997 | Sampei et al. | 430/536 |

FOREIGN PATENT DOCUMENTS

| 0 558 131 A1 | 9/1993 | European Pat. Off. . |
| WO 97/02329 | 1/1997 | WIPO . |

*Primary Examiner*—Richard L. Schilling
*Attorney, Agent, or Firm*—Frishauf, Holtz, Goodman, Langer & Chick, P.C.

[57] ABSTRACT

An anti-static-treated film material having an electro-conductive layer is disclosed. The film material contains at least one selected from conductive particles and semi-conductive particles at an amount between 1 and 50 vol. % with respect to said electro-conductive layer and polymer particles having an average particle diameter of 0.01 to 5 $\mu$m, and the absolute value of impedance of said film material under frequency at 20 Hz is between $4\times10^5$ and $1\times10^{20}$ $\Omega$. The film material is suitably used as a support of a silver halide light sensitive material.

20 Claims, No Drawings

PLASTIC FILM HAVING AN IMPROVED ANTI-STATIC PROPERTY

BACKGROUND OF THE INVENTION

The present invention relates to a plastic film which has an enhanced anti-static property, and, therefore, which may advantageously be applied to magnetic tapes, floppy disks, flexible substrata, materials for membrane switches, recording sheet for printers, etc. Particularly since this is used for films which do not lose transparency, the film may also be utilized for films for OHP., liquid crystal display devices, touch panels, stained glasses, etc. Further, because its transparency is such excellent that does not have adverse influences on the photographic properties, the plastic film can also be applied to light-sensitive photographic materials. Particularly in the case of light-sensitive photographic materials, owing to its excellent properties, the plastic film can be applied not only to silver halide light-sensitive materials, but also to light-sensitive materials in which light-sensitive materials other than silver halide is used.

Generally, plastic films (hereinafter, they may also be simply referred to as "films") have a strong electrification property. Therefore, they are often restricted for their use except when they are utilized using this property per se. For example, In the field of silver halide light-sensitive photographic material (it may also be hereinafter simply referred to as "light-sensitive photographic material"), plastic films are commonly used as supports for their electrically insulating property. Since the light-sensitive photographic material is a compound material consisting of a support and light-sensitive photographic layers, it tends to be electrified easily due to contact friction or peeling between two surfaces of similar or different materials. Electrostatic potential accumulated by electrification causes a variety of hindrances. The most serious hindrance is that light-sensitive emulsion layers are subjected to light exposure upon discharge of the electrostatic potential electrified before development, causing spotty, or branch- or plumage-shaped marks, which are so-called "static marks". For example, when this phenomenon turns out in medical or industrial x-ray images, it can lead to very dangerous diagnoses or judgments. This phenomenon is one of the most difficult problems because this phenomenon becomes clear after development. Further the accumulated electrostatic potential can be a cause of other troubles of adhesion of dust onto the surface of films, or that even coating on the surface of films cannot be performed.

Such hindrances other than those mentioned above due to electrification, a lot more cases take place. For example, they may take place during manufacturing process due to contact friction of photographic film and rollers during winding of photographic films or upon separation of the surface of the rewinding of the surface of the emulsion from the surface of the support; and, moreover, due to mechanical contact with or separation of x-ray films from automatic x-ray photographing machines, fluorescent sensitizing screens or other packaging materials. Occurrence of such static marks becomes remarkable, with enhancement of sensitivity of light-sensitive photographic films or processing speeds of the same. Particularly, in recent years, due to enhancement of sensitivity, and coating and processing speeds, occurrence of static marks becomes more likely to take place.

Further, recently adhesion of dust after development has turned out to be a big problem and improvement in sustaining of anti-static property even until after development process has become requested.

The best way to eliminate these hindrances due to electrostatic charge, is to confer electroconductivity on the material and thus to get the accumulated electrostatic potential to be leaked and lost during a short period of time before discharge.

Accordingly, lots of attempts and proposals for improving electroconductivity of photographic supports or the surfaces of various coating layers have so far been proposed and application of various kinds of surface active agents, polymers, etc. have been attempted. For example, Japanese Patent O.P.I. Publications No. 49-91165(1074) and No. 49-121523(1974) disclose a technology of applying ionic polymers having a dissociative group in the main chain thereof. Beside the above, inventions concerning electroconductive polymers disclosed in Japanese Patent O.P.I. Publication No.2-9689(1990), No.2-182491(1990) and inventions concerning surface active agents disclosed in Japanese Patent O.P.I. Publications No. 63-55541(1988), No. 63-148254(1099), No. 63-148256(1988), No. 1-314191 (1989),etc. are known.

However, many of these substances often show peculiarity depending on kinds or nature of film supports or photographic compositions. That is to say, although they can give favorable results to a certain kinds of film supports, photographic emulsions and photographic constituting elements, however, they cannot only give such helpful results at all as anti-static agents, purpose, but also do they often show adverse influences on the photographic properties. As further important disadvantage, most of these substances lose electroconductive function under low humidity conditions.

For the purpose of reducing degradation of the photographic properties under low humidity condition, Japanese Patent Publication Nos. 35-6616(1960) and No. 1-20735 (1989) disclose a technology of using metal oxide as an anti-static agent. The technology disclosed in the former reference relates to a method of using colloidal dispersion, the latter disclosing a method of using powder of metal oxides having high crystallinity by treatment at high temperature. However in the latter reference, it is described that since powder having high crystallinity is employed, it is necessary for particle size and particle/binder ratio, etc. with respect to light scattering to be taken into account. Further in the technology disclosed in Japanese Patent O.P.I. Publication No. 4-29134(1992), for the purpose of improving not only properties under low humidity condition but also other defects, application of particulate and fibrous metal oxides is disclosed as electro-conductive elements has been disclosed, however, a problem on the amount of addition has still remained.

Recently, consumption of silver halide light-sensitive photographic material has continuously been increasing. Accordingly, amount of photographic materials to be processed has also been increased and, thus, still further demand for rapid processing, or increasing amount of processing speed in a predetermined period of time has been made. Therefore, it has been demanded that silver halide light-sensitive materials have stronger resistance against rough handling during processing operation. Still more, as environmental regulation has become stricter, processing with lower replenishment, decreasing amount of waste processing solution has also been necessary.

Among various photographic properties, anti-static property is one upon which tougher demand has been made. Heretofore, as anti-static agents used for the light-sensitive materials, high molecular weight electrolytes or surface active agents have been used. As these high molecular weight electrolytes and surface active agents have a water-soluble property, they are inclined to elute into processing solutions during processing, often causing stain or sludge. Because of this, when these high molecular weight elctrolytes or surface active agents are used, one having large water-solubility was selected or means to bridge the high molecular weight electrolytes was adopted. However, when the amount of replenishment is made reduced they cannot solve the problems of staining and sludging. In order to eliminate these disadvantages, Japanese Patent Publication No. 60-49894(1985) proposes a technology of using water insoluble crystalline metal oxide particles together with hydrophobic binders such as vinylidene, etc. In this case, the hydrophobic binders have no electro-conductivity, in order to confer conductivity it is necessary for the filling ratio of the particles in the conductive layer to be increased, and in this reference 80% by weight or more has been proposed. However, crystalline metal oxide particles scatter light and, therefore, application thereof to silver halide light-sensitive materials causes a problem of devitrification. Particularly, application to light-sensitive materials, which comprise a transparent support coated thereon with a light-sensitive emulsion layer, is difficult. In order to overcome this problem of devitrification, Japanese Patent Publication No. 3-24656(1991) proposes using a hydrophilic binder and a nonionic surface active agent together with the crystalline metal oxide particles, and Japanese Patent Publication No. 3-24657(1991) proposes the use of a hydrophilic binder and fluorinated-type surface active agent together with the crystalline metal oxide particles. However, with these technologies, in order to confer electro-conductivity, it is shown that filling ratio of at least 50% is necessary. Problem of devitrification may not be solved satisfactorily, and, moreover, since these technologies necessitate the use of a water-soluble anti-static agent, they also have problems of staining of processing solutions and generation of sludge.

It has been investigated on light-sensitive materials which do not cause sludge in the processing solution, while maintaining good anti-static performance, have unexpectedly found that adhesion of sludge to the light-sensitive material is remarkably reduced when impedance of the light-sensitive material, which is one of electric properties of the light-sensitive material, is made at a certain value or therebelow, and the amount of replenishment of the processing solution is at a certain level or therebelow.

Thus although various attempts to overcome the detriment of plastic films caused by static electricity have been made for a long time, and relation between mechanism of generation and material has remained unknown, and, particularly in the field of photography, in which such a detriment often turns out to be fatal, it has long been selected to be the best means, for example, to provide by coating electroconductive metal oxides as an electroconductive layer.

However, as regards light-sensitive photographic materials provided with a electroconductive layer containing electroconductive metal oxide particles, lots of problems have still remained unsolved, notwithstanding various researches have been made as a means for improving degradation of photographic performance under low humidity condition for a period over 30 years, up to today, since disclosure in Japanese Patent Publication No. 35-6616(1960).

For example, when a layer containing such an electroconductive metal oxide particles is provided adjacent to a silver halide emulsion layer, fogging by pressure or scratch marks are likely to take place in the image due to friction during manufacturing or processing operations. When, as another example, it is used by together with a polymer binder, since the fine particles which are present on the surface easily fall away behind, leaving a problem of spoiling products during manufacturing procedure by adhesion to transport rulers. Still further, as those materials comprising metal elements as the main ingredient generally have relatively high specific gravity, often causing a problem of precipitation during coating on the light-sensitive photographic materials, which also cause problems of uniformity of coating solutions, preservation, etc.

Most of these problems may be solved by making the particles finer, however, preparation of finer particles causes the following new problem. That is to say, they are problems of increased viscosity of coating solutions, problems of operation caused therefrom, problem of precipitation of particles caused by increase in cohesion power, etc. It is possible to solve the problems of viscosity increase of coating solutions and precipitation of coagulated particles by reducing adding amount of addition of the electroconductive particles and reducing concentration, respectively. However, simple reduction of the amount of the electroconductive particles is likely to lead degradation in anti-electrostatic performance.

SUMMARY OF THE INVENTION

Accordingly, the objective of the present invention is to provide a transparent plastic film material and, in particular, a silver halide light-sensitive photographic material by the use thereof. Another objective of the present invention is to prevent adhesion of sludge present in the processing solution to light-sensitive materials.

An anti-static-treated film material of the invention comprises an electro-conductive layer whererin the film material contains at least one selected from conductive particles and semi-conductive particles at an amount between 1 and 50 vol. % with respect to said electro-conductive layer and polymer particles having an average particle diameter of 0.01 to 5 $\mu$m, and the absolute value of impedance of said film material under frequency at 20 Hz is not less than $4 \times 10^5$ $\Omega$. The absolute value of impedance of said film material under frequency at 20 Hz is preferably not more than $1 \times 10^{20}$ $\Omega$.

The preferable examples of electro-conductive particles or semi-conductive particles are oxide sol containing a metal element.

The electro-conductive or semi-conductive particles are preferably an oxide containing a metal element manufactured under temperature not higher than 400° C.

The preferable polymer particles are structured by a polymer which is insoluble in water.

The dry thickness of said electro-conductive layer is preferably 1.3 or more times as thick as the average diameter of the polymer particles.

The raw plastic film material to be anti-static treated comprises as its main ingredient syndiotactic polystyrene.

The anti-static-treated film material of the invention may have an electro-conductive layer on one side or both side. In both cases it may have two or more electro-conductive layers at each side.

The anti-static-treated film material of the invention is used as a support of a silver halide light-sensitive photographic material.

This electro-conductive layer preferably comprises an organic compound, of which Tg or fusing temperature is 50° C. or below, at an amount between 0.001 and 10 vol %, with respect to said electro-conductive layer.

DETAILED DESCRIPTION OF THE INVENTION

Vol % used in the presenter invention was obtained with reference to a specific gravity value described in popularly known reference such as a chemical handbook, etc. As regards specific gravity of an element which is not found in a popular references, a value shown in the same chemical formula or the same composition formula.

For example, specific gravity of tin oxide contained in tin oxide sol, specific gravity of $SnO_2$ was used in substitution. Thus, a value 7 was used in the present invention.

The plastic film material can be utilized, except for photographic light-sensitive materials, for magnetic tapes, floppy disks, flexible substrata, substrata for membrane switching elements, recording papers for printers, etc. Particularly, the plastic film material according to the present invention can also be utilized for films which do not lose transparency, the plastic film materials of the present invention can be utilized for the prevention of static electricity of various film products including films for over head projectors, liquid crystal display devices, touch panels, stained glasses, etc. As mentioned above, although the plastic film material is particularly effective for the purpose of improving transparency, however, the advantage may also be applied to products other than transparent film materials mentioned above.

As it is well known in the art, electric conductivity of the plastic film materials are brought about by charged carriers such as cations, anions, electrons, holes, etc.

When the main charge carrier is ions the material is a solid electrolyte. When, on the other hand, the charge carrier is an electron it is a semi-conductor. Usual electro-conductive materials are electro-conductive materials in which both are mixed and non-stoichiometric compounds such as oxygen deficient oxides, hyper-metallized oxides, metal deficient oxides, hyperoxides, etc. are semi-conductors. Conductivity of most electro-conductive materials exhibit their conductive property like this and a method of preventing electrostatic charging by dispersing fine particles made of electro-conductive or semi-conductive particles and conferring electro-conductivity on insulating polymers have been well investigated. A condition has been found, under which both transparency and electro-conductivity are both satisfied after carrying out various researches on the combination of polymers and electro-conductive or semi-conductive fine particles.

Further it is well known in the art when electro-conductivity of a material increases, absolute value of impedance decreases as shown in the well-known formula (1) below.

$$|Z|=[R^2+(1/\omega C)^2]^{1/2} \qquad (1)$$

Wherein,

Z: impedance

R: resistance

C: electrostatic capacity $\omega$: $2\pi f$ f: frequency.

However, the problems caused by electrification of a film such as adhesion of dust can be solved when the absolute value of impedance is $4 \times 10^5$ $\Omega$ or more. For example, for the purpose of preventing static electrification, excessive amount of electro-conductive fine particles are coated on a transparent film to an extent for transparency of the film to be lost, electro-conductivity on the surface of the film is enhanced and the magnitude of specific surface resistance measured by the use of direct electric current becomes sufficiently low and, at the same time, the absolute value of impedance measured by using alternating electric current is also lowered. Film materials of this kind do not cause a hindrance by electrification by static electricity, however, because transparency is remarkably lost, it is against the objective of the present invention. In the case, on the other hand, when transparency is given priority and the amount of addition of the electro-conductive fine particles are reduced, the surface specific resistance is elevated and the absolute value of impedance is also elevated. Thus, transparency may be improved, however, anti-static electrification performance is deteriorated and there will be a problem hindrances accompanying static electrification such as adhesion of dust may take place.

As is obvious, when the specific surface resistance, or the absolute value of the impedance is lowered, anti-static electrification performances improve. Thus based on this concept, endeavor and development have been made. In the present invention, hindrance by static electricity has been overcome by specific combination of the absolute value of impedance with composition.

That is to say, in order to satisfy transparency, it is necessary for the amount of addition of fine particles to be reduced, however, as explained hereinabove, improvement of the specific surface resistance becomes difficult. However, after intensive investigation on relation between anti-static performance and impedance, the present inventors have found that anti-static processing is possible even in the region where addition of electro-conductive particles does not adversely effect on transparency, or the absolute value of impedance exceeds $4 \times 10^5$ $\Omega$. Thus the present inventors have found that rise of the absolute value of impedance means that it is not necessary to increase the amount of addition of the electro-conductive fine particles, and that it is possible to control and improve various properties of plastic films by the use of polymer binders, and thus this is a new means to achieve anti-static electrification while undergoing restriction of transparency.

Like this, in the region where the addition of the electro-conductive particles does not affect transparency, considering that by regulating the absolute value of impedance at frequency of 20 Hz by means of selecting the particle diameter, it is possible to produce a film which simultaneously satisfies both transparency and anti-static performance. We have found:

conditions of absolute impedance value which a film material should satisfy;

the added amount of electro-conductive particles; and diameter of the polymer latex particles or polymer binder particles or polymer particles.

Concerning measurement of impedance of the film material, any conventional impedance measuring apparatus can be used. Preferably, it is an apparatus comprising an impedance measuring apparatus capable of measuring frequency of 1 Hz or higher, and an electrode for film measurement in combination. For example, a combination of precision LCR meter Type HP4284A, (a product of Yokokawa-Hewlett-Packard Co. Ltd., hereinafter simply referred to as "YHP") and HP16451B. When other apparatus is used, it is necessary to conduct correction in the electrode portion. It is necessary for measurement of the film materials to be made correctly, when an apparatus, by which correction is impossible, is used, favorable results may not be obtained. An example of obtaining the absolute value of impedance at 20 Hz using the combination of this apparatus is described in detail, however, threes no specific limitation as to the manner of measurement as far as the absolute value of impedance at 20 Hz is measurable.

Using a precision LCR meter, model #HP4284A, a product of YHP, to which HP16451B having two parallel plane electrodes and a guard electrode are connected, the absolute value of impedance of a film material is measured by an air gap method. Concerning the air gap method, an electrode non-contact method, which is described in the HP16451B manual, is employed. Although there is no specific limitation as to the size of the sample, if it is larger than the surface of the electrode, when the diameter of the main electrode is 3.8 cm, a square sample of 25–36 cm$^2$ or, 5 cm×5 cm to 6 cm×6 cm, is preferable. When the magnitude of the surface specific D.C. resistance on both sides of the sample measured applying D.C. is identical, either surface may face upward, however, in the case when the specific resistance is not equivalent, place the lower specific resistance surface up, set the sample between the two parallel plane electrodes, and carry out measurement by the air gap method, while applying A.C.

As for measured preferable range, the absolute value of impedance at 20 Hz using an electrode having an area of 11–12 cm$^2$ is not less than $4\times10^5$ Ω, preferably not less than $8\times10^5$ Ω and, more preferably, between $1\times10^6$ and $10^{20}$ Ω. It becomes possible to manufacture a film material within the composition range mentioned below, in which both anti-static performance and transparency are compatible.

Preferable range of addition amount of the electro-conductive particles varies deepening upon the color, shape, composition, etc. of the particle. However, taking transparency into consideration, content per unit volume in the anti-static layer of not more than 50 vol %, preferably not more than 40 vol %, and more preferably, not more than 37 vol %. In the case where transparency condition is strictly selected, not more than 28 vol % and, still more preferably, not more than 20 vol % is preferable. The minimum necessary amount of the electro-conductive particles is selected from the conditions in which the absolute value of impedance falls within the preferable range mentioned above. Attaching importance to this condition, electro-conductive particles are necessary at an amount not less than 1 vol %, preferably not less than 5 vol % and, more preferably, 10 vol %.

As regards organic compounds having Tg or melting point of not higher than 50° C., preferable results such as anti-cracking effect in the anti-static layer may also be expected, however, addition of too large amount often causes lowering of impedance and, accordingly, it is not preferable. For the reason like this, amount of addition is determined from the absolute value of impedance. Preferable amount of addition is preferably between 0.0001 vol % and 10 vol %, preferably between 0.0001 vol % and 8 vol % and. more preferably, between 0.0001 vol % and 5 vol %.

The anti-static layer is composed of the electro-conductive particles, an organic compound having Tg or melting point at not higher than 50° C. and a polymeric binder as three main ingredients, and the absolute impedance value is controlled. Depending upon necessity, other ingredients such as cross-linking agent, surface active agent, matting agent, etc. can be added within the range they adversely effect the objects of the present invention. However, of course, addition of these other ingredients at an amount which spoils the objectives of the invention, or, at an amount exceeding the scope of the present invention is not preferable, because in that case, the objectives of the present invention may not be attained.

For the example of the electro-conductive particles, it may be any one which is an organic material, an inorganic material or a compound material of these. That is, it is a material, the main ingredient of the electro-conductive material of which has specific volume resistance between $10^{-5}$ and $10^9$ electro conductivity of $10^9$ Ω·cm, and it may consist of a single material or it may be composed of a combination of two or more different materials. Preferably, it is white or colorless metal oxide-type particles, and in these particles electro-conductivity tends to be lowered, a material having conductivity between $10^{-1}$ and $10^9$ Ω·cm is selected.

In the use for light-sensitive photographic materials, where good transparency is required, an amorphous metal oxide sol is preferable, and those materials having 10 and $10^8$ Ω·cm are selected. Although there is no specific limitation as to particle diameter of these particles, in the image taken using an electron microscope, those having a diameter not larger than 10 μm are preferable and, more preferably not larger than 1 μm. In the case where good transparency is required, not greater than 0.5 μm is desirable and, more preferably, they are particles of 0.001–0.5 μm in the form of an amorphous metal oxide sol.

As regards volume specific resistance, a value in which the volume specific resistance of a certain molding formed by applying a certain amount of pressure to a pulverized body is divided by $10^2$ is employed. Although there is no specific limit as to the pressure, preferably pressure greater than 10 kg/cm$^2$ and, more preferably, a specific volume resistance of a material formed by molding with pressure between 100 kg/cm$^2$ and 10 t/cm$^2$ and, then, divided by $10^2$ is employed. Generally, relation between pressure applied to a pulverized body and the specific volume resistance of molding, there is a tendency when the pressure is increased the specific volume resistance decreases. However, even when hydrostatic pressure of 3 t/cm$^2$ is applied, any lower value obtainable from a single crystal and it usually shows a value one hundred times as many as the specific volume resistance. Therefore, a value obtained by dividing by $10^2$ the specific volume resistance of a molding formed by applying a certain pressure to a polverulent body is employed.

Further, generally, semi-conductor denotes a material of which specific volume resistance is between 10 and $10^{12}$ Ω·cm and conductor means material with a specific volume resistance value less than 10 Ω·cm. In the present specification, both semi-conductive and conductive materials are called as conductive particles.

Moreover the structure of the electro-conductive particles may be either crystalline or non-crystalline, and their higher order structure may consist of either a uniform or uneven distribution in composition.

For organic materials, for example, conjugation-type polymers such as tetracyanoquinodimethane (TCNQ), polyacetylene (TFF), polyparaphenylene, polythiophen, polypyrrole, polyaniline, etc. or an ionic conductive polymers selected from the group consisting of a polymer obtained by doping an adequate doping agent these polymers; polyvinylbenzene sulfonates, polyvinylbenzytrimethylammonium chloride, quaternary polymers, etc. can also be used.

Still further, fine particles obtained by dispersing a carbon material in an organic resin and hardening them can also be used. As regards carbonic materials, they are materials manufactured through carbonizing process from organic compounds as starting materials, and, for example, coke, carbon fibers, vetreous carbon, thermally decomposed carbon, whisker, carbon black, etc, can be mentioned.

Particles which are in the boundary domain between organic and inorganic can also be applicable if they are electrically conductive and, for example, compounds having electro-conductivity not greater than $10^9$ Ω cm discolsed in Japanese Patent O.P.I. No. 6-248092 are suitable.

As examples of inorganic material, calcogens glass having metallic or electro-conductive property, particles of metal oxides, etc. can be mentioned. In light of chemical stability, metal oxides are preferable. However, of course, there is no specific limitation as to the material as far as it has an electro-conductive property. When a metal oxide is employed, any conventional method of synthesis can be used if it can attain the objective of the present invention. For example, manufacturing methods of fine and ultra-fine particles including, a co-precipitation method, a multi-step wet process, a sol-gel method, an atomizing method, a plasma thermal decomposition process, etc. can be mentioned. Herein, for the metal or compounds containing a metal includes, depending upon synthesizing method, compounds containing Li, Na, K, Rb, Cs, Be, Mg, Ca, Sr, Ba, Sc, Y, La, Ce, Ti, Zr, V, Nb, Cr, Mo, W, Mn, Fe, Co, Ni, Ru, Rh, Pd, Os, Ir, Pt, Cu, Ag, Au, Zn, Cd, Hg, Al, Ga, In, Tl, Si, Ge, Sn, Pb, As, Sb, Bi, Se, Te, and Po can be mentioned. More preferably, they are compounds containing, as their main ingredient, Ni, Ir, Rh, Nb, Ce, Zr, Th, Hf, Zn, Ti, Sn, Al, In, Si, Mg, Ba, Mo, W and V. Preferably, compounds which are soluble in water or organic solvents and, for example, water-soluble metal salts such as $FeSO_4.7H_2O$, $CuSO_4$, etc.; metal compounds which are soluble in organic solvents including, for example, $NiCl_2$, $PdCl_2$, etc; metal alkoxide such as $Ti(OC_3H_7)_4$, etc.; or organic metal oxide compounds such as ferrocene, etc. may be selected. Depending upon the method of synthesis, metals or metal compounds containing a metal as their main ingredient materials, which are solid under the room temperature, can be used in combination, There is no specific limitation as to raw materials and manufacturing methods and any material or manufacturing method can be employed.

With reference to composition of crystal figure of the metal oxide particles obtained according to these manufacturing methods mentioned above, any composition or any crystal figure may be employed as far as they can attain the objectives of the present invention.

For example, compounds taking specific lattices such as simple cubic lattice, body-centered cubic lattice, face-centered cubic lattice, simple rhombic lattice, bottom face-centered rhombic lattice, body-centered rhombic lattice, face-centered rhombic lattice, simple monoclinic lattice, bottom face-centered monoclinic lattice, triclinic lattice, rhombohedral lattice, etc. can be mentioned.

Moreover, in the present invention, crystalline porous material may also be used.

Besides these specific compounds, particles, from which any sharp diffraction peaks can be obtained when they are evaluated by powder x-ray diffraction method may also be used. If the composition of itself takes a specific crystal habit, or if most values of diffraction peaks can be identified with certain specific crystal, however, even if the peaks are not obvious due to partial widening of diffraction peaks, or even in the case of amorphous powder, of which all peaks have been widened, it can still be used if the objective of the present invention can be achieved. For an example of this kind of metal oxide, colloidal $SnO_2$ sol can be mentioned. This compound does not cause a problem such as precipitation and is a preferable compound to achieve the objective of the present invention. As regards manufacturing method of $SnO_2$ ultra-fine particles, temperature condition is particularly important and a method accompanying a thermal treatment at high temperature is not preferable because it brings about growth of primary particles or high degree of crystallization. When heat treatment is unavoidable, it should be carried out at not higher than 400° C., preferably, not higher than 300° C., more preferably not higher than 200° C. and, still more preferably, not higher than 150° C. The $SnO_2$ sol, of which manufacturing method is disclosed in Japanese Patent Publication No. 35-6616(1960) is a suitable example for the present invention. Still further, materials doped with a different kind of elements such as fluorine or antimony, etc. are also suitable.

As regards organic compounds, of which Tg or fusing point is not higher than 50° C., there is no specific limitation as to materials selected from categories selected from monomer, oligomer and polymer, however, preferably, polyether-type compounds such as ethylene glycol, propyrene glycol, 1,1,1-trimethylol propane, polyethylene glycol, polypropylene glycol, etc.; acryl-type compound such as polybutyl acrylate, polyacrylamide, etc.: polyvinyl alcohol, polyester-type compounds, etc. are preferable. There is no specific limitation as to manner of addition. For example, they may be added at the time of admixing the ingredients described in this invention, or when they are dispersed in water or an organic solvent, a solvent, to which other ingredients of the present invention are dispersed in advance in a dispersion medium such as water or an organic solvent, may be added.

These electro-conductive particles and semi-conductive fine particles are used after dispersed or dissolved in a binder. Also, after admixing the electro-conductive powder or metal oxide particles in a solvent in which electro-conductive polymer material is dissolved or dispersed, coating may be performed by dispersing the powder, which was subjected to spray-drying or freeze-drying process, in a binder and, then coating can be performed.

Although there is no specific limitation as to polymer particles, for example, proteins such as gelatin, casein; cellulose compounds such as carboxymethyl cellulose, hydroxyethyl cellulose, acetyl cellulose, diacetyl cellulose, triacetyl cellulose, etc.; sugars such as dextran, agar, sodium arginate, starch derivative, etc.; synthetic polymers such as polyvinyl alcohol, poly vinyl acetate, polyacrylates, polymethacrylates, polystyrene, polyacrylamide, poly-N-vinyl-pyrrolidone, polyester, polyvinyl chloride, polyacrylic acid, etc. can be mentioned. Particularly, they are gelatin (lime-treated gelatin, acid-treated gelatin, enzyme-decomposed gelatin, phthalic gelatin, acetylated gelatin, etc.), acetyl cellulose, diacetyl cellulose, triacetyl cellulose, polyvinyl acetate, polyvinyl alcohol, poly butyl acrylate, polyacrylamide, dextran, water-soluble polyester resin, etc., and it is preferable that they are not dispersed in the state of single molecular but in the state of polymer particles, in which a plurality of molecular are aggregated into solid particles. When it is hydrophobic polymer latex, it can be used as it is, however, when, for example, this is a hydrophilic polymer like gelatin, it is preferable to for the polymer to be cross-linked using an appropriate cross-linking agent, or it is used in the form of protective colloid. That is to say, in the present invention, it is possible to employ polymers which are conventionally known in the art, however, particularly in the case of a hydrophobic binder, it is necessary for it to be processed and, then used in the form of particles.

The polymer particles is a compound capable of forming a film, and it is necessary for them to be polymer particles having an average diameter between 0.01 and 5 μm, preferably between 0.02 and 1 μm and, more preferably, between 0.05 and 0,5 μm. As to relation between polymer particles and the particle diameter of the electro-conductive particles, the effect of the present invention can be exhibited within the range provided in the present invention, however, preferably, the diameter of the electro-conductive polymer particles is not less than 1.1 times as large as, and, more preferably not less than 1.5 times as large as that of the shorter diameter of the electro-conductive particles. The effect of the present invention can be exerted more remarkably.

As regards the manner of determination of the particle size, it is preferable to employ the average particle size obtained by a method using a particle size distribution analyzer, such as precipitation method, a laser diffraction method, etc. Also, the particle size may be determined using a electron microscopic images. However, when an electron microscope is used, the most largest diameter among particles present within a field of view is employed. In the case where particles form a higher-order structure by chemically combining with each other, measurement is performed by the higher-order unit.

As regards the method of dispersing the electro-conductive or semi-conductive particles in the (mixture of the polymeric binder and the organic compound having Tg or fusing point not higher than 50° C., a method using free rotary movement, a variety of methods including, for example, a method of using impeding movement in a container in which hindrance plates are provided, a method of using toppling movement caused when a sealed container is rotated around the horizontal axis, a method of utilizing oscillation movement by which the container is shaked up and down, a method of utilizing a shearing force on the roll, etc, any method can be selected as far as they may not jeopardize the objective of the present invention.

Dry thickness of the electro-conductive layer according to the present invention is preferably not less than 1.3 times as large as the particle diameter of the polymeric particles. When this is less than 1.3 times, filling structure within the electro-conductive layer becomes insufficient, and manifestation of electro-conductivity in the adding ratio of the electro-conductive particles becomes unstable. Still more preferably, this is not smaller than 1.5 times and not greater than 100 times as large as the particle size of the polymer particle.

Next, a case in which the conductive layer consists of a polymer binder and latex particles having on the surface thereof an electro-conductive organic polymer is explained. It is preferable that the electro-conductive layer is comprises said electro-conductive organic polymer at a quantity of 10 to 50 vol. %. The minimum necessary amount of the electro-conductive polymer is selected from the condition under which the absolute value of impedance falls within the preferable range mentioned hereinabove. Attaching importance to this condition, the electro-conductive polymer is necessary at an amount not smaller than 1 vol %, preferably not smaller than 5 vol. % and, more preferably, not smaller than 10 vol. %.

The latex particles having on the surface thereof an electro-conductive organic polymer particles are preferably hydrophobic colloidal particles (A) protected with an electro-conductive organic polymer (B) that is a hydrophilic polymer compound having an anionic functional group.

Weight of said electro-conductive inorganic polymer (B) is preferably between 31% and 500% with respect to the above-mentioned hydrophobic polymer particles (A).

Added amount of the electro-conductive organic polymer contained in the electro-conductive layer varies depending upon the content of the latex particles having on the surface thereof an electro-conductive organic polymer. Taking adhesion performance into consideration, content per unit volume in the anti-static layer is generally not greater than 50 vol. %, preferably not greater than 40 vol. % and, more preferably, not greater than 37 vol. %.

In the present specification the term "electro-conductive polymer" denotes polymers described in "Electro-Conductive Polymer" published by Kodansha Scientific Co., Ltd., edited by Naoya Ogata.

A variety of compounds can be mentioned as the electro-conductive organic polymer. For example, electro-conductive organic polymer (B), which is a hydrophilic polymer compound having an anionic functional group, can be mentioned as preferable example.

The electro-conductive organic polymer (B) is a hydrophilic polymer compound having an anionic functional group and, for example, polymers containing at least one electro-conductive group selected from the group consisting of a sulfonic acid group, a sulfate group, a quaternary ammonium salt, a tertiary ammonium salt, and a carboxyl group can be mentioned. The electro-conductive group is necessarily contained at an amount not less than 5 weight % with respect to one molecule of polymer. Water-soluble electro-conductive polymer may contain, for example, a hydroxyl group, an amino group, an epoxy group, an aziridine group, an active methylene group, a sulfinic acid group, an aldehyde group, and vinylsulfon group.

Molecular weight of the polymer is, generally between 1,000 and 500,000, and, preferably, between 2,000 and 100,000.

Below, examples of the compound used in the present invention are given.

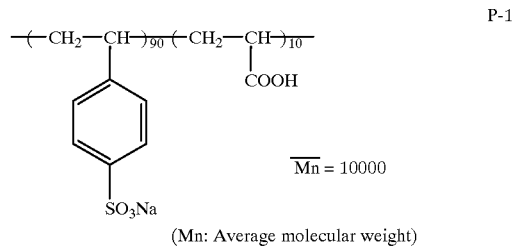

P-1

(Mn: Average molecular weight)

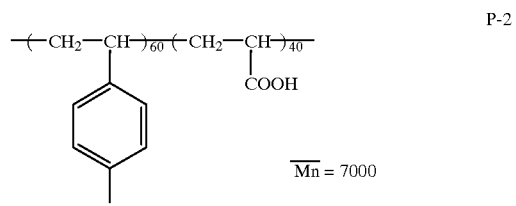

P-2

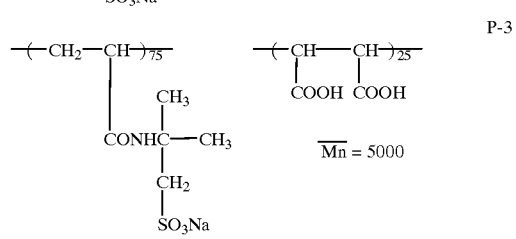

P-3

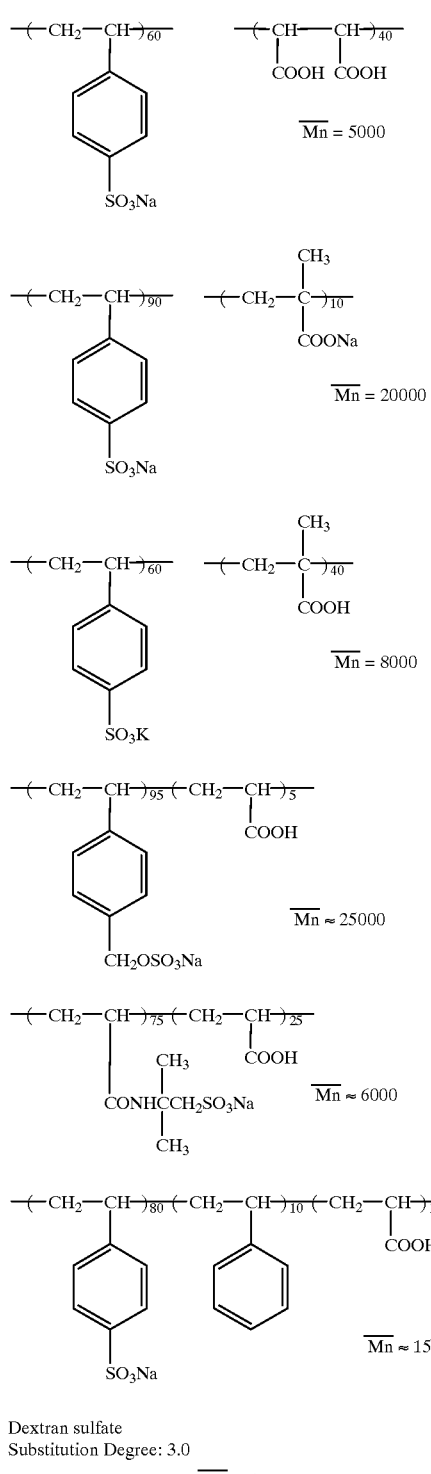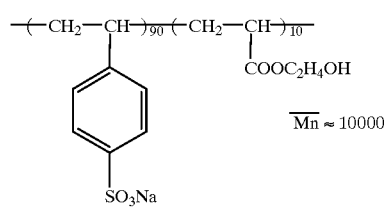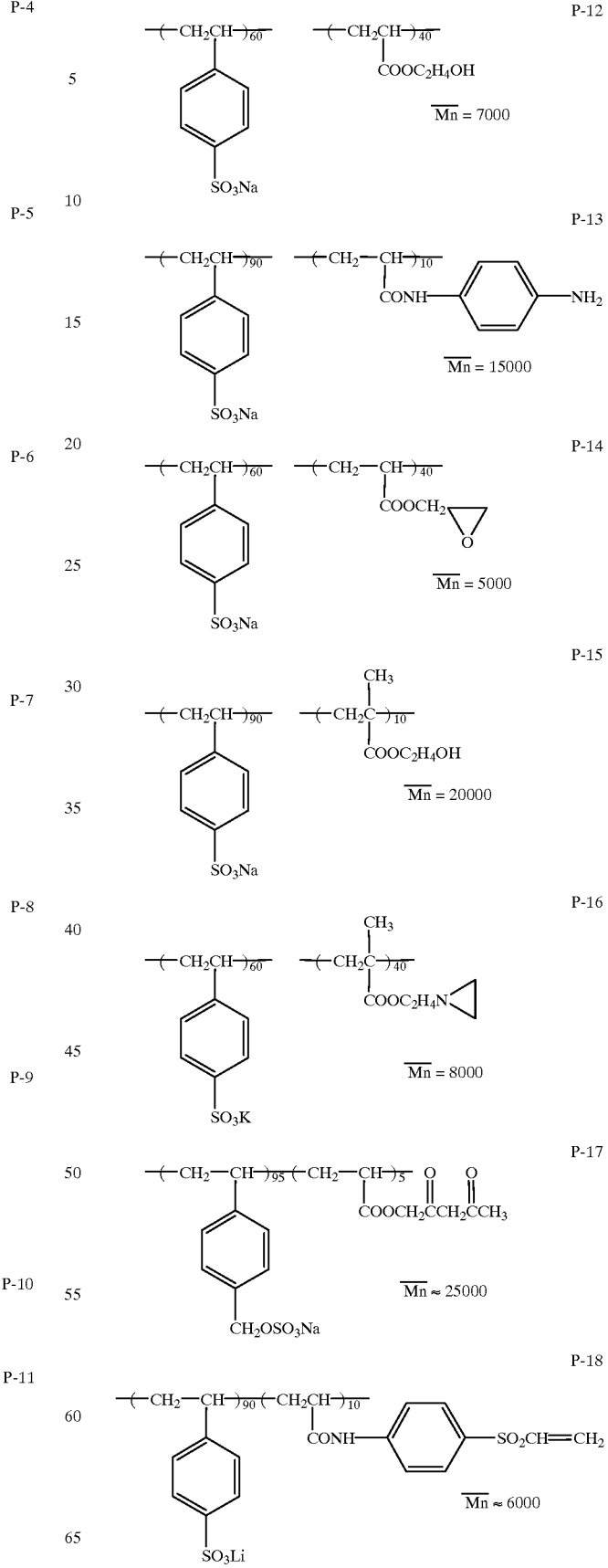

-continued

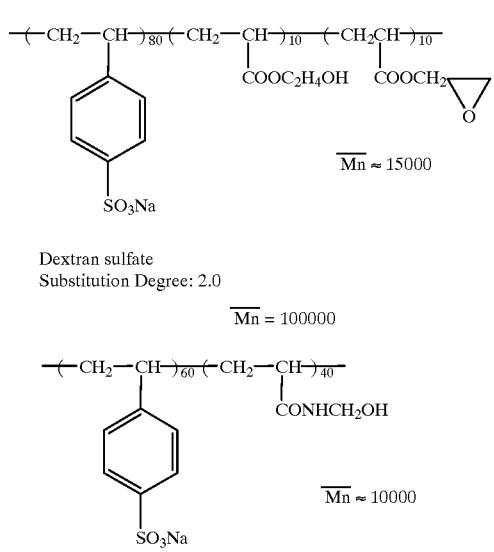

P-19

$\overline{Mn} \approx 15000$

Dextran sulfate
Substitution Degree: 2.0

P-20

$\overline{Mn} = 100000$

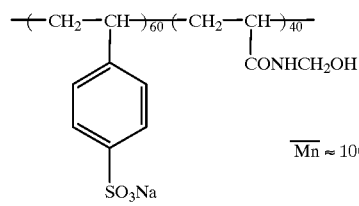

P-21

$\overline{Mn} \approx 10000$

In the above-mentioned P-1 through P-21, the average molecular weight denotes the number average molecular weight and is according to the value measured by GPC represented by polyethylene glycol conversion.

When the weight average molecular weight of the electro-conductive organic polymer (B) is less than 1,000, adsorption to the hydrophobic polymer (A) becomes insufficient, dispersion stability is likely to be deteriorated. On the contrary thereto, when the weight average molecular weight exceeds 500,000, manufacture of the electro-conductive particles of the present invention by emulsification polymerization may be difficult due to rise of viscosity of an aqueous solvent.

Further, among electro-conductive organic polymers used in the present invention, those having a sulfonic acid group and a carboxyl group are particularly preferable, and they are prepared by copolymerizing a monomer containing a sulfonic acid group and a monomer containing a carboxyl group.

The above-mentioned polymerizable monomer include, for example, vinylsulfonic acid, 2-acrylamide-2-methylpropane sulfonate, 2-acrylamideethyl sulfonate, allyl sulfonate, meta-allyl sulfonate, styrene sulfonic acid or salts of these monomers can be mentioned. Among these polymerizable monomers, styrene sulfonic acid and a salt thereof is used preferably for its excellent electro-conductivity.

For the polymerizable monomers containing the above-mentioned carboxyl group, for example, monocarboxylic acid such as acrylic acid, methacrylic acid, crotonic acid, maleic acid, fumaric acid, itaconic acid, etc., or di-carboxylic acid or acid anhydride thereof can be mentioned. Among these, for the reason of enhancing water-proofing performance of a coated film, dicarboxylic acids are preferable and, particularly maleic acid is preferable.

Further in the electro-conductive organic polymer (B), other functional groups than the sulfonic acid group and carboxyl group may be introduced. Accordingly, besides the above-mentioned polymerizable monomers, other monomer such as a monomer having a vinyl group capable of copolymerization.

There is no specific limitation as to the manner of polymerization of the above-mentioned polymerizable monomers and any conventionally known method can be employed. Specifically, for example, a manner, in which a polymerizable monomer containing the above-mentioned sulfonic acid group, a polymerizable monomer containing the carboxylic group and, if necessary, other polymerizable monomers are dissolved in water, add a polymerization initiator such as potassium persulfate and heat the mixture, to initiate polymerization.

Other methods than those mentioned above may also be employed. That is to say, the electro-conductive organic polymer (B) can be obtained by, first preparing a copolymer by polymerizing a polymerizable monomer not containing a solfonic acid group and a polymerizable monomer containing a carboxyl group are polymerized, to produce a co-polymer and, then, subject thus produced copolymer to sulfonation treatment, to prepare an electro-conductive organic polymer (B). In this case, although there is no specific limitation regarding sulfonation ratio, 30–95% is preferable and 45–90% is particularly preferable in light of dispersion stability.

Although there is no specific limit as to the polymerizable monomer not containing a sulfonic acid group, for example, styrene, α-methyl styrene, etc. can be mentioned.

And, first prepare a co-polymer according to the above-mentioned manner and, then, sulfonation is conducted to the product. There is no specific limitation as to the manner of this sulfonation and any conventionally known method can be employed. To be specific, put the above-mentioned co-polymer in a solvent and then sulfonation is carried out using a sufonation agent.

For the above-mentioned solvents, for example, hydro-carbons such as dichloromethane, 1, 2-dichloroethane, etc.; hydrocarbons such as n-hexane, cyclohexane, etc. can be mentioned as preferable solvents. Among these, dichloroethane, etc, can be mentioned as particularly preferable solvents because they seldom react with the sulfonation agent and, therefore do not form salts at the time of neutralization.

For the above-mentioned sulfonizing agent, for example, $SO_3$, complexes of a Lewis acid and $SO_3$, chlorosulfonic acid, etc. can be mentioned. In the above-mentioned solvents the sulfonation reaction is performed under temperature condition not higher than 300° C.

In these electro-conductive organic polymer (B), ratio between the sulfonic acid group and carboxylic acid group in terms of molar ratio of the functional group, is, generally sulfonic acid group/carboxylic acid group=10/90–95/5, preferably, sulfonic acid group/carboxylic acid group=20/80–80/20 and, particularly preferably, sulfonic acid group/carboxylic acid group=30/70–60/40.

Next, the hydrophobic polymer particles (A) used in the present invention, are prepared by polymerizing monomers having a polymeric functional group and, for such monomers, for example, a vinyl monomer, a poly-functional vinyl monomer, an epoxy group-containing monomer can be mentioned and they are used either singly or two or more kinds in combination.

For the above-mentioned monomer, for example, aromatic vinyl monomer such as styrene, α-methylstyren; acrylates or methacrylates such as methyl acrylate, butyl acrylate, 2-ethylhexyl acrylate, methyl methacrylate, etc.; mono-carboxylic acid, di-carboxylic acid or di-carboxylic acid anhydride such as acrylic acid, methacrylic acid, crotonic acid, maleic acid, fumaric acid, itaconic acid, etc.; halogenized vinyl monomers such as vinyl chloride, vinylidene chloride, etc.; vinyl esters such as vinyl acetate, etc.; conjugated dienes such as butadiene, isoprene, etc. can be mentioned.

For the above-mentioned monomer containing the epoxy group, glycidyl acrylate, glycidyl methacrylate, etc. can be mentioned.

Among these monomers having a polymerizable functional group, poly-functional vinyl monomer is used preferably.

And, besides the above-mentioned monomers, monomers having a vinyl group and other reactionable and functional group can be mentioned, and for the same reason mentioned above, it is preferable to use this. For the reactionable and functional groups, for example, functional groups such as epoxy group, methylol group, oxazoline group, isocyanate group, etc. can be mentioned. Further, as specific examples of the monomer having these functional groups and a vinyl group, for example, trimethylolpropane triacetate, glycidyl acrylate, glycidyl methacrylate, N-methylol acrylamide, vinyl oxazoline, 2-propenyl, 2-oxazoline, m-isopropyl-α,α-dimethylbenzyl isocyanate, etc. can be mentioned.

Next, manner of preparation of latex particles used in the present invention having on the surface thereof an electro-conductive organic polymer is explained.

The electro-conductive particles used in the present invention are prepared polymerizing monomers having the above-mentioned polymerizable functional group in an aqueous solvent in which above-mentioned electro-conductive organic polymer (B) is present. Specifically, polymerization method such as emulsification polymerization, dispersion polymerization, etc. is applied.

As the above-mentioned aqueous solvent, water is usually used, however, if necessary, it is also possible to use alcohols such as methanol, propanol, etc. and other organic solvents as well.

The electro-conductive organic polymer (B) is dissolved in the above-mentioned aqueous solvent. As this electro-conductive organic polymer (B), for example, one which has been neutralized with sodium hydroxide can be used. Moreover, the blending proportion of this electro-conductive organic polymer with respect to 100 parts by weight (hereinafter simply referred to as parts) of monomer having the polymerizable functional group is, generally 31–500 parts, preferably 100–400 parts and, more preferably, 200–300 parts. That is to say, when the proportion is 30 parts or less, stability of the particles to be produced becomes insufficient, dispersion stability of the particles to be obtained in the form of an emulsion tends to be insufficient, and, further, satisfactory electro-conductivity may not be obtained. Still more when the proportion exceeds 500 parts, there is a tendency that film-forming property and a water-proofing performance of the coated film are degraded. And by adding monomer having polymerizable functional group to this aqueous solvent and undergoing the mixture to emulsion polymerization, electro-conductive particles can be obtained in the form of an emulsion.

Further, in the above-mentioned aqueous solvent, if necessary, surface active agent for emulsion polymerization, seed emulsion and other hydrophilic polymer can be mixed.

For the above-mentioned surface active agent for emulsion polymerization, for example, anionic surface active agents such as aliphatic acids, alkylbenzene sulfonates, sulfates of higher alcohols, etc.; non-ionic surface active agents such as polyethylene glycol, etc. can be mentioned.

For the above-mentioned seed emulsion, for example, acrylic emulsion, acrylic/styrene emulsion, etc. can be mentioned. More specifically, styrene/butyl methacrylate/methacrylic acid can be mentioned.

For the above-mentioned other hydrophilic polymer, polyvinyl alcohol, acrylic resin, polyester resin, etc. can be mentioned.

The mixing proportion of the above-mentioned surface active agents for emulsion polymerization, seed emulsion and other hydrophilic polymer with respect to 100 parts of monomer having the polymerizable and functional group is 0.5–500 parts, respectively.

Still further, other than the above-mentioned surface active agents, polymerization initiator such as persulfates such as potassium persulfate, etc, inorganic compound such as sodium acetate, chain transfer agent such as n-dodecyl mercaptan, etc. can also be used.

Further, in the case when as the monomer having a polymerizable functional group, a monomer having a vinyl group and other reactionable functional group is used, a reaction accelerator can be used in the aqueous solvent for the purpose of accelerating reaction. For this reaction accelerator, for example, ammoniacal water, triethylamine, triethanolamine, triethyl ammonium chloride; etc. can be mentioned.

The particle diameter of the electro-conductive particles used in the present invention is, generally, 0.01–2.0 $\mu$m and, preferably 0.04–0.1 $\mu$m.

For the configuration of the electro-conductive particles, besdides the above-mentioned emulsion or dispersion, in the form of sol or power, in which aqueous solvent has been partially or completely removed can be mentioned. When the electro-conductive particles are made into sol or powder form, they may be used as a coating-type anti-static agent by dispersing, again, in the aqueous solvent.

The electro-conductive particles used in the present invention may be coated with a coating solution without a binder, however, it is suitable to use other polymeric binder in combination.

For the binder used in the electro-conductive layer used in the present invention, proteins such as gelatin, gelatin derivative; cellulose compounds such as carboxymethyl cellulose, hydroxyethyl cellulose, diacetyl cellulose, triacetyl cellulose, etc.; sugar derivatives such as agar-agar; sodium arginates, starch derivatives, etc.; synthetic hydrophilic colloid such as polyvinyl alcohol, polyacrylic acid copolymer, or derivatives thereof, and partial hydrolyzed products thereof, vinyl polymers or copolymers thereof such as polyacrylate, etc.; natural products and derivatives thereof such as rosin, shellac, etc.; and other synthetic resins may be used. Further, aqueous emulsions of polyesters, acrylic-modified polyesters, vinylidene chloride, polyethylene imine, polyurethane, styrene-butadiene copolymer, polyacrylic acid, polyacrylate and derivatives thereof, polyvinyl acetate, vinyl acetate-acrylate copolymers, polyolefins, olefin-vinyl acetate copolymer, etc. can also be used.

Among these, preferably, gelatin and its derivatives, cellulose compounds, polyesters acryl-modified polyester, polyurethane, copolymers of polyacrylic acid and its derivatives are used. Still more preferably, gelatin, acryl-modified polyester and copolymers of polyacrylate and its derivatives are used.

Further, in the anti-static layer comprising the electro-conductive particles according to the present invention, a variety of organic or inorganic hardening agent can be added. These hardening agents may be either low molecular weight compounds or high molecular weight compounds. Also, they may be used either singly or two or more kinds in combination.

For the low molecular hardening agents, for example, those low molecular hardening agents described on pages 77–88, 4th edition of "The Theory of the Photographic process" edited by T. H. James, etc. can be used and, among them, compounds having a vinylsulfonic acid, aziridine group, an epoxy group or a triazine group are preferable and, particularly, those low molecular compounds described in Japanese Patent O.P.I. publication Nos. 53-41221(1978) and 60-225143(1985) are preferable.

The high molecular hardening agent denotes a compound with molecular weight not smaller than 2,000 and having at least two groups which are capable of reacting with the hydrophilic colloid such as gelatin, and for such groups capable of reacting with the hydrophilic colloid include, for example, aldehyde group, epoxy group, active halides such as dichlorotriazine group, chloromethylstylyl group, chloroethylsulfonyl group, etc.. Active vinyl groups, active ester group, etc. can be mentioned.

For the high molecular hardening agent, for example, polymers having an aldehyde group such as dialdehyde starch, polyacrolein, acrolein copolymers disclosed in U.S. Pat. No. 3,396,020; polymers having an epoxy group such as those disclosed in U.S. Pat. No. 3,623,878; polymers having a dichlorotriazine group such as those disclosed in Research Disclosure No. 17,333(1978), polymers having active ester group such as those described in Japanese Patent O.P.I. Publication No.56-142524(1981); polymers having an active vinyl group or a precursor thereof such as those described in Japanese Patent O.P.I. Publication No. 56-142524(1981), U.S. Pat. No. 4,161,407, Japanese Patent O.P.I. Publication No. 54-65033(1979), Research Disclosure No. 16,725, etc. are preferable. In particular, those polymers in which an active vinyl group or a precursor group thereof is combined to the main chain through a long spacer as disclosed in Japanese Patent O.P.I. Publication No. 56-142524(1981) are preferable.

The added amount of the hardening agent is, when a binder is used, 0.01–30% by weight and, preferably, 0.05–20% by weight.

In the case when the binder is not used, 0.01–30% by weight and, preferably, 0.05–20% by weight with respect to the electro-conductive particles.

For the plastic film material, for example, cellulose nitrate film, cellulose acetate film, cellulose acetate butyrate film, cellulose acetate propionate film, polystyrene film, polyethylene terephthalate film, polycarbonate film, and other lamination products of the above-mentioned films can be mentioned.

Stereoscopically highly regular polymers may also be used by selecting the condition for the polymerization. For example, plastic films containing syndiotactic polystyrene as the main ingredient may also be used. Effect of the present invention can be exerted more effectively in the film which is easily electrified as the SPS film.

The film containing syndiotactic polystyrene as its main ingredient means one, in which stereoscopically regular structure (tacticity) has a stereosciopic structure in which a phenyl group or a substituted phenyl group, which constitute a side chain with respect to the main chain consisting of carbon—carbon bondages, located alternatively in the opposite direction, and the main chain is a styrene-type polymer or a composition containing it. When it is a homopolymer of styrene, it can be polymerized in the manner described in Japanese Patent O.P.I. Publication No. 62-117708(1087) and concerning its polymer it can be polymerized in the manner described in Japanese patent O.P.I. Publication Nos. 1-469121(1989), 1-178508(1989), etc.

Its tacticity can be determined quantitatively by magnetic nuclear resonance using a carbon isotope ($^{13}$C-NMR method). The tacticity measured by $^{13}$C-NMR can be represented by the proportion of consecutively existing structuring unit present in plural number. For example, the tacticity is represented by diad in the case of two, triad in the case of three and pentad in the case of five, respectively, however, in the styrene-type polymer having the syndiotactic structure according to the present invention, usually not less than 75% and, preferably, not less than 85% raceme diad; usually not less than 60% and, preferably, not less than 75% with raceme triad; and usually not less than 30% and, preferably, not less than 50% with raceme pentad, are suitable, respectively.

For the specific monomers constituting a polymer, with which syndiotactic polystyrene-type composition is constructed, for example, alkylstyrenes such as styrene, methylstyrene, etc.; halogeno (alkyl) styrenes such as chloromethyl styrene, chloro styrene, etc.; alkoxy styrene, vinyl benzoate, etc. can be mentioned, and these monomers can be used either singly or as a mixture. In particular, copolymers made of alkyl styrene and styrene is a preferable combination to produce a film having the film-thickness not thinner than 50 μm.

The polystyrene-type resin having the syndiotactic structure can be manufactured through polymerization using the above-mentioned monomer as a catalyst for polymerization, and using (a) (i) transition metal compound and (ii) aluminoxane as the main ingredients; (b) (i)transition metal compound and (ii) a compound capable of producing an ionic complex upon reaction with the transition metal compound as the main ingredients.

These plastic film materials can be used as a support for light-sensitive photographic materials. Moreover, transparent substrata can be made into not only colorless transparent supports, but also colored transparent ones by adding dyes or pigments.

For the light-sensitive material, various kinds of light-sensitive materials including, for example, usual black-and-white silver halide light-sensitive photographic materials such as black-and-white light-sensitive materials for picture taking, black and-white light-sensitive materials for x-ray photography, black-and-white light-sensitive materials for lithography, etc.; conventional multi-layer color light-sensitive materials including, for example, color reversal films, color negative films, color positive films, etc.; transfer image-forming materials, for example, for color proof used for proving in photo-lithography, etc. can be mentioned.

Silver halide photographic emulsion used in the invention is prepared by the steps of:

(a) a step of generating nuclei for tabular-shaped silver halide grains by introducing silver salt and halide into a dispersion medium in the presence of not more than 30 mol % of halide;

(b) a step of undergoing Ostwald ripening subsequent to the nuclear generation under conditions of maintaining the main (100) plane of the tabular-shaped grains; and (c) a step of growing the grains so that they may have required grain size and silver chloride content.

For the method of reacting the silver salt and the halide salt at the time of nuclear generation, double-jet method (simultaneous mixing method) is preferably used.

The simultaneous mixing method may be used during the time of grain growth. As one mode of the simultaneous mixing method, a so-called "controlled double-jet method, in which pAg in the liquid phase in which silver halide is generated is maintained to be constant, may also be used. According to this method, a silver halide emulsion containing silver halide crystals having regular crystal shape and grain size can be obtained.

Manufacturing process of the silver halide emulsion may comprise a step of supplying fine silver halide grains in the part or the whole procedure of the crystal generation step.

Since the grain size of the fine particles governs supplying speed of halide ion, preferable grain size may vary depending on the size or halide composition of the basic or host silver halide grains, grains having the average sphere-equivalent diameter smaller than 0.3 mm are used. More preferably, it is smaller than 0.1 µm. In order for the fine particles to be deposited on the host grains by recrystallization, it is preferable that the size of this fine grains to be smaller than that of the host grains, and, more preferably, this is 1/10 or smaller than this sphere-equivalent diameter.

The silver halide emulsion to be used upon practice can undergo noodle washing or flocculation precipitation process in order to remove soluble salts after completion of the grain growth, and adjust pAg ion concentration to the value suitable for carrying out chemical ripening. Preferable washing methods are, for example, a method of using aromatic hydrocarbon-type aldehyde resins containing a sulfo group as disclosed in Japanese Patent Publication No. 35-16086 (1960), or desalination method using Exemplified Compounds G-3, G-8, etc., which are polymeric flocculation agents, etc. can be mentioned. Further, de-salination may be performed by ultra-filtration method described in Research Disclosure (RD), No.10,208, vol. 102 (October 1972), and vol.131, No.13,122, (March 1975).

In the silver halide emulsion used in the invention, various kinds of hydrophilic colloides as a binder to protect silver halide. For this purpose, photographic binders including, for example, gelatin, synthetic polymers such as polyvinyl alcohol, polyacrylamide, etc., colloidal alubmin, polysaccharide, cellulose derivatives, etc. can be employed.

The photographic emulsion can be spectrally sensitized using cyanine dyes or other compounds. The sensitizing dye may be used either singly or two or more kinds in combination. Combined use of sensitizing dyes is often employed for the purpose of hyper-sensitization.

In the light-sensitive photographic materials in which the silver halide emulsion is used, a variety of photographic additives may be incorporated either before, during or after physical ripening or chemical ripening step.

For such photographic additives used in these steps, include, for example, those various kinds of compounds disclosed in the above-mentioned references and Research Disclosure (RD) No.308,119 (December 1989) can be mentioned. Kind and location of reference of the compounds are described below:

| | [RD-17643] | | [RD-18716] | [RD-308119] | |
|---|---|---|---|---|---|
| | Page | Category | Page | Page | Category |
| Chemical sensitizer | 23 | III | 648 upper right | 996 | III |
| Sensitizing dye | 23 | IV | 648–649 | 996–998 | IV |
| Desensitizing dye | 23 | IV | | 998 | IVB |
| Dye | 25–26 | VIII | 649–650 | 1003 | VIII |
| development accelerator | 29 | XXI | 648 upper right | | |
| Anti-foggant Development inhibitor | 24 | IV | 649 upper right | 1006–1007 | VI |
| Brightening agent | 24 | V | | 998 | V |
| Hardener | 26 | X | 651 left | 1004–1005 | X |
| Surface active agent | 26–27 | XI | 650 right | 1005–1006 | XI |
| Plasticizer | 27 | XXI | 650 right | 1006 | XXI |

-continued

| | [RD-17643] | | [RD-18716] | [RD-308119] | |
|---|---|---|---|---|---|
| | Page | Category | Page | Page | Category |
| Lubricant | 27 | XXI | | | |
| Matting agent | 28 | XVI | 650 right | 1008–1009 | XVI |
| Binder | 26 | XXII | | 1003–1004 | |
| Support | 28 | XVII | | 1009 | XVII |

In the silver halide light-sensitive photographic material, if necessary, an anti-halation layer, a filter layer, etc. can be provided.

In the silver halide light-sensitive photographic material, photographic emulsion layer and other hydrophilic colloid layers can be coated on the support or other layer by various kinds of coating methods. For coating, dip coating method, a method using a roller, a curtain coating method, extrusion coating method, a method using a slide hopper, etc. can be employed. For details, methods described on pages 27–28, vol. 176 of The Research Disclosure on "Coating Procedures" can be used.

For processing the light-sensitive materials used in the present invention, processes using the processing solutions described in the above mentioned Research Disclosure Nos. 17,643, Item XX–XXI on pages 29–30, or No. 308,119, Item XX–XXI on pages 1011–1012 can be applied.

For the developing agent for black-and-white processing compounds including, for example, dihydroxy benzene compounds such as hydroquinone; 3-pyrazolidone compounds such as 1-phenyl-3-pyrazolidone; aminophenol compounds such as N-methyl-amino phenol; etc. can be used either singly or in combination. In the developing solution, conventionally known additives, for example, preserving agents, alkali agents, pH buffers, anti-foggants, hardening agents, development accelerators, surface active agents, anti-foaming agents, color toners, softening agents, dissolution-aids, viscosity-increasing agents, etc. may be used depending upon necessity.

In the fixing solution, fixing agents such as thiosulfates, thiocyanates, etc can be used as the fixing agent, and, in addition, water-soluble aluminum salts such as potassium sulfates or potassium alum, etc. may be contained. Further, the fixing solution can contain preservatives, pH adjusters, softening agents, etc.

In the present invention, so-called an ultra-rapid processing, in which the total processing time (dry-to-dry) is carried out for the period shorter than 25 seconds. In the present invention, the term "period for development step", or "period of development" means the period, between the time when the front end of the light-sensitive material begins to be dipped in the development bath and the time when it begins to be dipped in the fixing solution. Similarly, the term "period of fixing denotes the period between the time when it begins to be dipped in the fixing solution and the time when it begins to be dipped in the next rinsing bath (stabilizing solution), "rinsing time" denotes the period during which it is dipped in the rinsing bath. Further, the term "drying period means the period of time, while the light-sensitive material stays in the drying zone, usually provided in an automatic processing apparatus, in which a hot air of 35–100 ° C. and, preferably, 40–80° C. is blowing. In the development process according to the present invention, temperatures and periods for development, fixing, rinsing or stabilizing are generally 3–15 seconds at 25–50°

C. and, preferably, 2–12 seconds at 39–40° C.; 2–12 seconds at 20–50° C. and, preferably, 2–15 seconds at 0–50° C.; 2–15 seconds at 0–50° C. and, preferably, 2–8 seconds at 15–40° C.; respectively. According to the method of the present invention, the photographic material which underwent development, fixing and washing or stabilization is dried after squeezing through squeezing rollers. Drying is usually performed at 40–100° C. and the drying period may be varied depending on the surrounding temperature. It is usually 3–12 seconds and, particularly preferably, 3–8 seconds at 40–80° C. It is still more preferable for the drying process to be performed using far infrared radiation heater or thermal roller.

EXAMPLES

Next, the invention is explained further in detail with reference to working examples.

(Dispersed solution of conductive particle P1)

A 10% 1,1,2,2-tetrachloroethane solution of (NP (NHC$_6$H$_5$)$_{1.6}$(NHC$_6$H$_4$SO$_3$H)$_{0.4}$)n: (N=545) was sprayed by means of a spray drying method, and then collected as a powder. With regard to the resulting powder, an average particle size was 0.15 μm, the specific gravity was 1.25 and the specific volume resistance was 2.3×10$^4$Ω cm.

The above-mentioned conductive powder was dispersed in water to a density of 8 wt %.

(Dispersed solution of conductive particle P2)

Sixty five g of stannic chloride hydrate was uniformly dissolved in 2000 cc of an aqueous water. Next, the resulting solution was boiled so as to obtain a co-precipitant. The resulting precipitant was taken up from decantation, and then the precipitation was washed for numerous times with distilled water. In the distilled water wherein the precipitation was washed, silver nitrate was dropped for confirming that there is no reaction of chlorine ions. Aforesaid precipitant was added to 1000 cc of distilled water and dispersed. Following this, the total amount was arranged to 2000 cc of solution. In addition, 40 cc of 30% aqueous ammonia was added to the aforesaid solution. When the resulting solution was heated in a water bath, SnO$_2$ sol solution is generated.

When aforesaid solution is used for a coating solution, the density is condensed while spraying ammonia to aforesaid sol solution to be used. In addition, with regard to the specific volume resistance of the particles contained in aforesaid sol solution, a thin layer was formed on a silica glass by the use of a sol solution, and a value measured by the use of a four probe method of resistivity measurement was defined to be the specific volume resistance value. The specific volume resistance value was 3.4×10$^5$Ωcm.

(Dispersed solution of conductive particle P3)

Sixty five g of stannic chloride hydrate and 1.0 g of antimony trichloride were dissolved in 2000 cc of an aqueous water for obtaining a uniform solution. Next, the resulting solution was boiled so as to obtain a co-precipitant. The resulting precipitant was taken up from decantation, and then the precipitation was washed for numerous times with distilled water. In the distilled water wherein the precipitation was washed, silver nitrate was dropped for confirming that there is no reaction of chlorine ions. Aforesaid precipitant was added to 1000 cc of distilled water and was dispersed. Following this, the total amount was arranged to 2000 cc. In addition, 40 cc of 30% aqueous ammonia was added to the aforesaid solution. When the resulting solution was heated in a water bath, SnO$_2$ sol solution is generated.

Aforesaid sol solution was sprayed to an electric furnace heated at 400° C. so that a conductive powder was synthesized. The resulting powder was molded by means of a tablet molder. Following this, the specific volume resistance measured by the four probe method of the resistivity measurement was 1.5×10$^1$Ω cm.

The above-mentioned conductive powder was dispersed in an aqueous ammonia having pH of 10 to a density of 8 wt %.

(Dispersed solution of conductive particle P4)

Particles wherein the surface of potassium titanic acid was laminated with conductive tin oxide (DENTALL produced by Ohtsuka Chemical Co., Ltd.) were dispersed in aqueous ammonia with pH of 10 in a manner that the density became 8 wt %).

Example 1

(Preparation of a support for a silver halide photographic light-sensitive material)

Both surfaces of a 100 μm thickness polyethylene terephthalate film, after being biaxially orientated and heat-fixed, were subjected to corona discharge with 8 W min./m$^2$. On one surface thereof, as described in Japanese Patent O.P.I. No. 19941/1984, the following subbing coating solution B-1 was coated as a subbing layer B-1 in such a manner as that its dry layer thickness would be 0.8 μm, after being dried at 100° C. for one minute. In addition, on the layer opposite the subbing layer B-1 on aforesaid polyethylene terephthalate film, as described in Japanese Patent O.P.I. No. 77439/1984, the following subbing coating solution B-2-1 was coated as subbing layer B-2. This layer was also dried at 100° C. for one minute.

Subbing layer No. 1

Subbing coating solution B-1

Copolymer latex solution composed of 30 wt % of butylacrylate, 20 wt % of t-butylacrylate, 25wt % of styrene and 25 wt % of 2-hydroxyethylacrylate (the solid portion was 30%) 270 g Compound A 0.6 g Hexamethylene-1,6-bis (ethylene urea) 0.8 g Water was added to make 1 liter.

Subbing coating solution B-2-1

Copolymer latex solution composed of 40 wt % of butylacrylate, 20 wt % of styrene and 40 wt % of glycidyl acrylate (the solid portion was 30%) 23 g Conductive Dispersant P2 415 g Polyethylene glycol (the molecular weight was 600) 0.00012 g Water 568 g Subbing layer No. 2

In addition, the above-mentioned subbing layers B-1 and B-2-1 were subjected to corona discharge at 8 W min./m$^2$, and then, the following coating solution B-3 was coated in such a manner that the dry layer thickness was 0.1 μm. This layer was dried at 100° C. for one minute.

| Subbing coating solution B-3 | |
| --- | --- |
| Gelatin | 10 g |
| Compound A | 0.4 g |
| Compound B | 0.1 g |

Water was added to make 1 liter.

Compound A

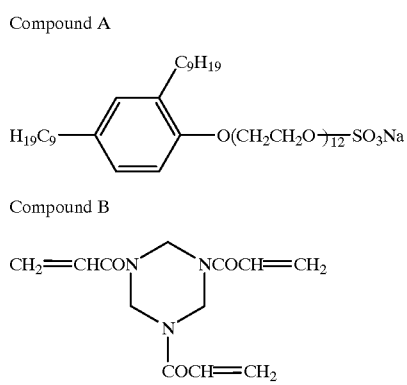

Compound B

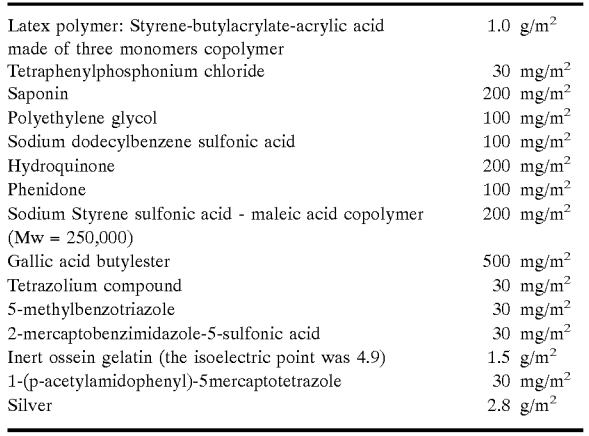

Preparation of emulsion

In an acid solution whose pH was 3.0, particles having rhodium in $10^{-5}$ mol per mol of silver was prepared by the controlled double jet method. The particles were grown in a system containing 30 mg of benzyladenine per 1 liter of 1% aqueous gelatin solution. After mixing silver with halide, 600 mg of 6-methyl-4-hydroxy-1,3,3a,7-tetrazaindene were added thereto per mol of silver halide, and then, the resulting mixture was washed and desalted.

Next, 60 mg of 6-methyl-4-hydroxy-1,3,3a,7-tetrazaindene per mol of silver halide were added to the resulting solution. Following this, the resulting mixture was subjected to sulfur sensitization. After the sulfur sensitization, as a stabilizer, 6-methyl-4-hydroxy-1,3,3a,7-tetrazaindene was added.

Silver halide emulsion layer

To each of the above-mentioned emulsions, additives were prepared and added in the following amounts, and were then added to the support.

| | |
|---|---|
| Latex polymer: Styrene-butylacrylate-acrylic acid made of three monomers copolymer | 1.0 g/m² |
| Tetraphenylphosphonium chloride | 30 mg/m² |
| Saponin | 200 mg/m² |
| Polyethylene glycol | 100 mg/m² |
| Sodium dodecylbenzene sulfonic acid | 100 mg/m² |
| Hydroquinone | 200 mg/m² |
| Phenidone | 100 mg/m² |
| Sodium Styrene sulfonic acid - maleic acid copolymer (Mw = 250,000) | 200 mg/m² |
| Gallic acid butylester | 500 mg/m² |
| Tetrazolium compound | 30 mg/m² |
| 5-methylbenzotriazole | 30 mg/m² |
| 2-mercaptobenzimidazole-5-sulfonic acid | 30 mg/m² |
| Inert ossein gelatin (the isoelectric point was 4.9) | 1.5 g/m² |
| 1-(p-acetylamidophenyl)-5mercaptotetrazole | 30 mg/m² |
| Silver | 2.8 g/m² |

Tetrazolium compound

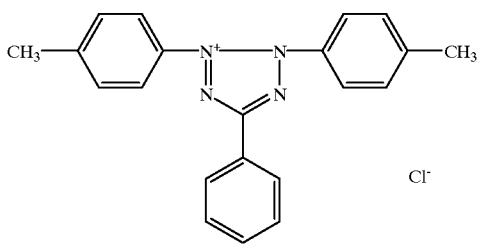

Protective layer for the emulsion layers

As a protective layer for the emulsion layers, the following solutions having the following added amounts were prepared and coated.

| | |
|---|---|
| Fluorinated dioctylsulfosuccinic acid ester | 300 mg/m² |
| Matting agent: Polymethacrylic acid methyl (the average particle size was 3.5 μm) | 100 mg/m² |
| Lithium nitric acid salt | 30 mg/m² |
| Acid-processed gelatin (the isoelectric point was 7.0) | 1.2 g/m² |
| Colloidal silica | 50 mg/m² |
| Sodium styrene sulfonic acid - maleic acid copolymer | 100 mg/m² |
| Mordant | 30 mg/m² |
| Dye | 30 mg/m² |

Mordant

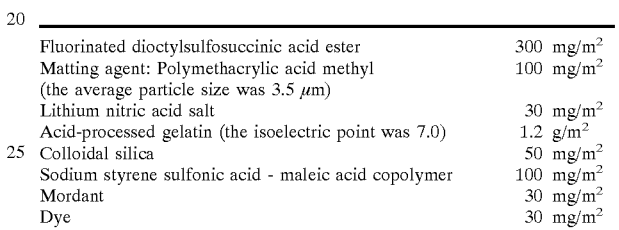

Dye

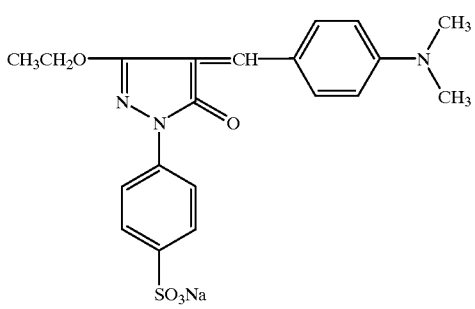

On the opposite side of the support from the emulsion layer, a backing dye having the following composition was coated. Gelatin layer was hardened with (d) which is composed of glyoxal, sodium 1-oxy-3,5-dichloro-D-triazine salt and a hydroxy-containing epoxy compound.

| | |
|---|---|
| Hydroquinone | 100 mg/m² |
| Phenydone | 30 mg/m² |
| Latex polymer: butylacrylate-styrene copolymer | 0.5 g/m² |

| -continued | |
|---|---|
| Styrene - maleic acid copolymer | 100 mg/m² |
| Citric acid | 40 mg/m² |
| Benzotriazole | 100 mg/m² |
| Styrene sulfonic acid - maleic acid copolymer | 100 mg/m² |
| Lithium nitric acid salt | 30 mg/m² |
| Backing dyes (a), (b) and (c) | respectively 40, 30 and 30 mg/m² |
| Ossein gelatin | 2.0 g/m² |

(a)

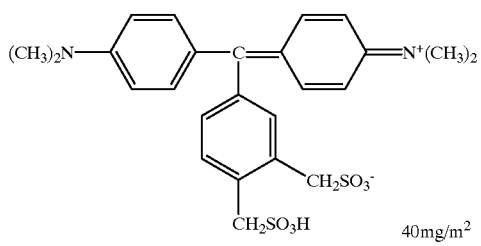

40mg/m²

(b)

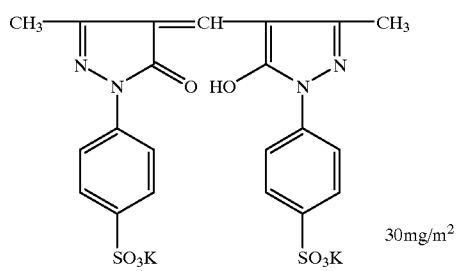

30mg/m²

(c)

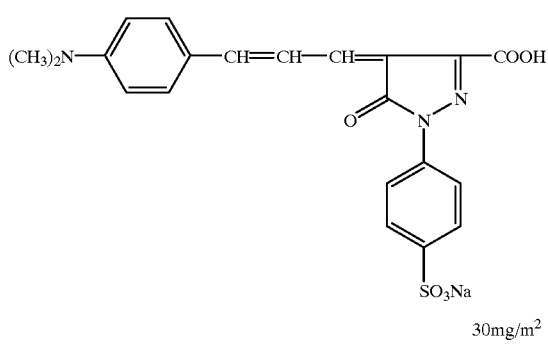

30mg/m²

(d)

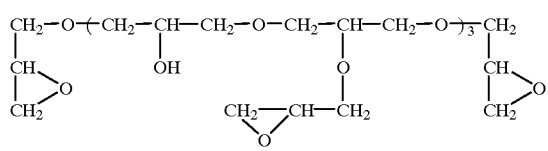

Samples obtained in the above-mentioned manner were subjected to overall exposure, and then, subjected to photographic processing using the developing solutions and fixing solutions describe below. Following this, they were subjected to the specific surface resistance test and the ash adhesion test. Table 1 shows the results thereof.

| Formula of the developing solution | |
|---|---|
| Hydroquinone | 25 g |
| 1-phenyl-4,4-dimethyl-3-pyrazolidone | 0.4 g |
| Sodium bromide | 3 g |
| 5-methylbenzotriazole | 0.3 g |
| 5-nitroindazole | 0,05 g |
| Diethylaminoproprane-1,2-diol | 10 g |
| Potassium sulfite | 90 g |
| Sodium 5-sulfo salicilic acid | 75 g |
| Sodium ethylene diamine pentaacetic acid | 2 g |
| Water was added to make 1 liter. | |
| pH was regulated to 11.5 with caustic soda. | |

| Formula of the fixing solution Composition A | |
|---|---|
| Ammonium thiosulfate (72.5 w % aqueous solution) | 240 ml |
| Sodium sulfite | 17 g |
| Sodium acetic acid tetrahydride | 6.5 g |
| Boric acid | 6 g |
| Sodium citric acid dihydride | 2 g |
| Acetic acid (90 wt %, an aqueous solution) | 13.6 ml |

| Composition B | |
|---|---|
| Pure water (ion-exchange water) | 17 ml |
| Sulfuric acid (an aqueous 50 wt %) | 3.0 g |
| Aluminumsulfate (an aqueous solution wherein the amount converted to $Al_2O_3$ was 8.1 wt %) | 20 g |

When the fixing solution was used, the above-mentioned compositions A and B were dissolved in 500 ml of water in this order. Water was added thereto to make 1 liter to be used. pH of this fixing solution was about 5.6.

| Photographic processing conditions | | |
|---|---|---|
| (Step) | (Temperature) | (Time) |
| Developing | 40° C. | 8 sec. |
| Fixing | 35° C. | 8 sec. |
| Washing | room temperature | 10 sec. |

Evaluation on anti-static performance: the ash adhesion testing method

Under 23° C. and 20% RH, an emulsion surface of the developed sample was rubbed with a rubber roller. Next, the ash of cigarette was held near so that whether or nor it was attracted to the film in accordance with the following criteria:
A: The ash is not attracted even when the cigarette was held as close as 1 cm.
B: The ash is attracted when the cigarette was held as close as 1–4 cm.
C: The ash is attracted when the cigarette was held as close as 4–10 cm.
D: The ash is attracted even when the cigarette was separated at 10 or more cm.
Specific surface resistance measurement method It was measured under the conditions of the imprinted voltage of 100V, 23° C. and 20% RH by the use of a Teraohmeter VE-30 produced by Kawaguchi Denki Co., Ltd.

Measurement method of the absolute value of the impedance

When impedance was measured, Precision LCR meter HP4284A and HP16451 produced by Yokogawa Hewletter Packard (hereinafter, referred to as YHP) were combined to be used.

Under atmosphere of 23° C. and 20% RH, the absolute value of the impedance of the film material was measured by means of a cavity method. With regard to the measurement of the cavity method, see an electrode non-contact method described in the operation manual (the parts number was 16451-97000, printed in December, 1989) of HP16451B. Using an electrode A wherein the diameter of the main electrode was 3.8 cm, the sample was cut to a square of 5.5×5.5 cm. The dispersion layer of the conductive particles were turned upward and measured.

Haze test

Samples subjected to subbing processing to the second layer, namely, namely a sample wherein subbing coating solutions B-1 and B-2-1 were coated and B-3 was coated on each layer was measured by the use of a turbidity measurer Model T-2600 produced by Tokyo Denshoku Co., Ltd. and its haze was represented by %.

EXAMPLE 2

Sample preparation conditions were the same as in Example 1 except that subbing coating solution B-2-2 was employed in place of subbing coating solution B-2-1, and aforesaid sample was subjected to the same evaluation as in Example 1.

| Subbing coating solution B-2-2 | |
|---|---|
| Copolymer latex solution composed of 40 wt % of butylacrylate, 20 wt % of styrene and 40 wt % of glycidyl acrylate (the solid portion was 30%) | 23 g |
| Conductive Dispersant P2 | 415 g |
| Polypropylene glycol (the molecular weight was 450) | 0.00001 g |
| Water | 568 g |

EXAMPLE 3

Sample preparation conditions were the same as in Example 1 except that subbing coating solution B-2-3 was employed in place of subbing coating solution B-2-1, and aforesaid sample was subjected to the same evaluation as in Example 1.

| Subbing coating solution B-2-3 | |
|---|---|
| Copolymer latex solution composed of 40 wt % of butylacrylate, 20 wt % of styrene and 40 wt % of glycidyl acrylate (the solid portion was 30%) | 23 g |
| Conductive Dispersant P3 | 760 g |
| Polyethylene glycol (the molecular weight was 600) | 1.65 g |
| Water | 700 g |

EXAMPLE 4

Sample preparation conditions were the same as in Example 1 except that subbing coating solution B-2-4 was employed in place of subbing coating solution B-2-1, and aforesaid sample was subjected to the same evaluation as in Example 1.

| Subbing coating solution B-2-4 | |
|---|---|
| Copolymer latex solution composed of 40 wt % of butylacrylate, 20 wt % of styrene and 40 wt % of glycidyl acrylate (the solid portion was 30%) | 24 g |
| Conductive Dispersant P2 | 600 g |
| Polyethylene glycol (the molecular weight was 600) | 1.2 g |
| Water | 800 g |

EXAMPLE 5

Sample preparation conditions were the same as in Example 1 except that subbing coating solution B-2-5 was employed in place of subbing coating solution B-2-1, and aforesaid sample was subjected to the same evaluation as in Example 1.

| Subbing coating solution B-2-5 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P2 | 80 g |
| Polyethylene glycol (the molecular weight was 350) | 0.0001 g |
| Water | 700 g |

EXAMPLE 6

Sample preparation conditions were the same as in Example 1 except that subbing coating solution B-2-6 was employed in place of subbing coating solution B-2-1, and aforesaid sample was subjected to the same evaluation as in Example 1.

| Subbing coating solution B-2-6 | |
|---|---|
| Copolymer latex solution composed of 40 wt % of butylacrylate, 20 wt % of styrene and 40 wt % of glycidyl acrylate (the solid portion was 30%) | 27 g |
| Conductive P4 dispersant | 62 g |
| Polyethylene glycol (the molecular weight was 600) | 0.00012 g |
| Water | 700 g |

EXAMPLE 7

Sample preparation conditions were the same as in Example 1 except that subbing coating solution B-2-7 was employed in place of subbing coating solution B-2-1, and aforesaid sample was subjected to the same evaluation as in Example 1.

| Subbing coating solution B-2-7 | |
|---|---|
| Copolymer latex solution composed of 40 wt % of butylacrylate, 20 wt % of styrene and 40 wt % of glycidyl acrylate (the solid portion was 30%) | 27 g |
| Conductive P4 dispersant | 39 g |
| Polyethylene glycol (the molecular weight was 600) | 0.52 g |
| Water | 690 g |

EXAMPLE 8

Sample preparation conditions were the same as in Example 1 except that subbing coating solution B-2-8 was employed in place of subbing coating solution B-2-1, and aforesaid sample was subjected to the same evaluation as in Example 1.

| Subbing coating solution B-2-8 | |
| --- | --- |
| Copolymer latex solution composed of 40 wt % of butylacrylate, 20 wt % of styrene and 40 wt % of glycidyl acrylate (the solid portion was 30%) | 27 g |
| Conductive P4 dispersant | 16 g |
| Polyethylene glycol (the molecular weight was 600) | 0.33 g |
| Water | 750 g |

EXAMPLE 9

Sample preparation conditions were the same as in Example 1 except that subbing coating solution B-2-9 was employed in place of subbing coating solution B-2-1, and aforesaid sample was subjected to the same evaluation as in Example 1.

| Subbing coating solution B-2-3 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P3 | 430 g |
| Polyethylene glycol (the molecular weight was 600) | 0.0001 g |
| Water | 720 g |

EXAMPLE 10

Sample preparation conditions were the same as in Example 1 except that subbing coating solution B-2-10 was employed in place of subbing coating solution B-2-1, and aforesaid sample was subjected to the same evaluation as in Example 1.

| Subbing coating solution B-2-10 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P3 | 420 g |
| Polyethylene glycol (the molecular weight was 600) | 0.00015 g |
| Water | 730 g |

EXAMPLE 11

Sample preparation conditions were the same as in Example 1 except that subbing coating solution B-2-11 was employed in place of subbing coating solution B-2-1, and aforesaid sample was subjected to the same evaluation as in Example 1.

| Subbing coating solution B-2-11 | |
| --- | --- |
| Copolymer latex solution composed of 40 wt % of butylacrylate, 20 wt % of styrene and 40 wt % of glycidyl acrylate (the solid portion was 30%) | 27 g |

| Subbing coating solution B-2-11 | |
| --- | --- |
| Conductive Dispersant P2 | 700 g |
| Polyethylene glycol (the molecular weight was 600) | 1.6 g |
| Water | 800 g |

EXAMPLE 12

Sample preparation conditions were the same as in Example 1 except that subbing coating solution B-2-12 was employed in place of subbing coating solution B-2-1, and aforesaid sample was subjected to the same evaluation as in Example 1.

| Subbing coating solution B-2-12 | |
| --- | --- |
| Copolymer latex solution composed of 40 wt % of butylacrylate, 20 wt % of styrene and 40 wt % of glycidyl acrylate (the solid portion was 30%) | 23 g |
| Conductive Dispersant P3 | 620 g |
| Polyethylene glycol (the molecular weight was 600) | 1.55 g |
| Water | 690 g |

EXAMPLE 13

Sample preparation conditions were the same as in Example 1 except that subbing coating solution B-2-13 was employed in place of subbing coating solution B-2-1, and aforesaid sample was subjected to the same evaluation as in Example 1.

| Subbing coating solution B-2-13 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P2 | 82 g |
| Polyethylene glycol (the molecular weight was 600) | 0.17 g |
| Water | 690 g |

EXAMPLE 14

Sample preparation conditions were the same as in Example 1 except that subbing coating solution B-2-14 was employed in place of subbing coating solution B-2-1, and aforesaid sample was subjected to the same evaluation as in Example 1.

| Subbing coating solution B-2-14 | |
| --- | --- |
| Copolymer latex solution composed of 40 wt % of butylacrylate, 20 wt % of styrene and 40 wt % of glycidyl acrylate (the solid portion was 30%) | 27 g |
| Conductive P1 dispersant | 82 g |
| Polyethylene glycol (the molecular weight was 600) | 0.00012 g |
| Water | 680 g |

EXAMPLE 15

Sample preparation conditions were the same as in Example 1 except that subbing coating solution B-2-15 was employed in place of subbing coating solution B-2-1, and aforesaid sample was subjected to the same evaluation as in Example 1.

| Subbing coating solution B-2-15 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P2 | 41 g |
| Polyethylene glycol (the molecular weight was 600) | 0.96 g |
| Water | 700 g |

EXAMPLE 16

Sample preparation conditions were the same as in Example 1 except that subbing coating solution B-2-16 was employed in place of subbing coating solution B-2-1, and aforesaid sample was subjected to the same evaluation as in Example 1.

| Subbing coating solution B-2-16 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P3 | 83 g |
| Polyethylene glycol (the molecular weight was 600) | 0.48 g |
| Water | 700 g |

EXAMPLE 17

Sample preparation conditions were the same as in Example 1 except that the following SPS film as a plastic film was employed in place of subbing coating solution B-2-1, and aforesaid sample was subjected to the same evaluation as in Example 1.

SPS film

The SPS pellet was prepared in accordance with Japanese Patent O.P.I. Publication No. 131843/1991. The resulting pellet was subjected to fusion extrusion. The above-mentioned fusion polymer was extruded onto an extrusion die through a pipe. By extruding it onto a casting drum chilled by means of a die slit while impressing static electricity. As a result, an SPS unoriented sheet having layer thickness of 1000 μm was obtained.

After the prepared sheet preliminary was heated at 115° C., aforesaid sheet was oriented 3.3 times in a vertical direction. Next, in a Tenter, the sheet was preliminary heated at 100° C. and then oriented 3.3 times horizontally. Next, while slightly loosening the sheet in the horizontal direction, the sheet was heat-fixed at 225° C. so that the SPS film having 100 μm thickness was obtained.

Comparative example 1

Sample preparation conditions were the same as in Example 1 except that subbing coating solution B-0-1 was employed in place of subbing coating solution B-2-1 as a subbing layer was employed, and aforesaid sample was subjected to the Haze evaluation as in Example 1.

| Subbing coating solution B-0-1 | |
|---|---|
| Copolymer latex solution composed of 40 wt % of butylacrylate, 20 wt % of styrene and 40 wt % of glycidyl acrylate (the solid portion was 30%) | 270 g |
| Water was added to make 1 liter. | |

Comparative example 2

Sample preparation conditions were the same as in Example 1 except that subbing coating solution B-O-2 was employed in place of subbing coating solution B-2-1 as a subbing layer was employed, and aforesaid sample was subjected to the same evaluation as in Example 1. However, tin oxide powder solution contained in subbing solution B-O-2 is an aqueous ammonia solution wherein tin oxide in which 3% antimony oxide was added at 900° C. was burned, and powder crushed with a ball mill was contained by 8 wt %. The average particle size of this powder was 0.5 μm and the specific gravity was 6.9.

Preparation method of subbing coating solution was conducted in the same manner as in Example 1. In a coating solution container after the film was coated, precipitant of the tin oxide powder was observed.

| Subbing coating solution B-0-2 | |
|---|---|
| Copolymer latex solution composed of 40 wt % of butylacrylate, 20 wt % of styrene and 40 wt % of glycidyl acrylate (the solid portion was 30%) | 27 g |
| Tin oxide powder solution | 90 g |
| Polyethylene glycol (the molecular weight was 600) | 1.3 g |
| Water | 800 g |

Comparative example 3

Sample preparation conditions were the same as in Example 1 except that subbing coating solution B-O-3 was employed in place of subbing coating solution B-2-1 as a subbing layer was employed, and aforesaid sample was subjected. to the Haze evaluation as in Example 1. The prepared film was slightly gray.

| Subbing coating solution B-0-3 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P3 | 45 g |
| Water | 750 g |

Comparative example 4

Sample preparation conditions were the same as in Example 1 except that subbing coating solution B-O-4 was employed in place of subbing coating solution B-2-1 as a subbing layer was employed, and aforesaid sample was subjected to the Haze evaluation as in Example 1. The prepared film was slightly gray.

| Subbing coating solution B-0-4 | |
|---|---|
| Copolymer latex solution composed of 40 wt % of butylacrylate, 20 wt % of styrene and 40 wt % of | 10 g |

-continued

| Subbing coating solution B-0-4 | |
| --- | --- |
| glycidyl acrylate (the solid portion was 30%) | |
| Conductive Dispersant P3 | 580 g |
| Polyethylene glycol (its molecular weight was 600) | 1.4 g |
| Water | 480 g |

Comparative example 5

Sample preparation conditions were the same as in Example 17 except that subbing coating solution B-O-1 was employed, and aforesaid sample was subjected to the same evaluation as in Example 1.

TABLE 1

| Example No. | $\|Z\|$ (20 Hz:Ω) | Added amount of fine particles (vol %) | Added amount of organic compounds (vol %) | Dust adhesion test | Haze | Remarks |
| --- | --- | --- | --- | --- | --- | --- |
| Example 1 | $255 \times 10^4$ | 40 | 0.001 | A | 2 | |
| Example 2 | $290 \times 10^4$ | 40 | 0.001 | A | 2 | |
| Example 3 | $135 \times 10^4$ | 50 | 10 | A | 2.5 | |
| Example 4 | $128 \times 10^4$ | 45 | 8 | A | 2 | |
| Example 5 | $100 \times 10^4$ | 10 | 0.001 | A | 2 | |
| Example 6 | $98 \times 10^4$ | 8 | 0.001 | A | 2 | |
| Example 7 | $295 \times 10^4$ | 5 | 6 | A | 2 | |
| Example 8 | $110 \times 10^4$ | 2 | 4 | A | 1.5 | |
| Example 9 | $90 \times 10^4$ | 37 | 0.001 | A | 2 | |
| Example 10 | $85 \times 10^4$ | 37 | 0.001 | A | 2.5 | |
| Example 11 | $45 \times 10^4$ | 45 | 10 | A | 2.5 | |
| Example 12 | $51 \times 10^4$ | 50 | 10 | A | 2 | |
| Example 13 | $65 \times 10^4$ | 10 | 1.8 | A | 2 | |
| Example 14 | $55 \times 10^4$ | 10 | 0.001 | A | 1.5 | |
| Example 15 | $70 \times 10^4$ | 5 | 10 | A | 2 | |
| Example 16 | $45 \times 10^4$ | 10 | 5 | A | 2 | |
| Example 17 | $205 \times 10^4$ | 40 | 0.001 | A | 2 | |
| Comp. 1 | $30 \times 10^4$ | 0 | 0 | C | 2 | |
| Comp. 2 | $36 \times 10^4$ | 10 | 12 | C | 4 | |
| Comp. 3 | $34 \times 10^4$ | 5 | 0 | B | 2 | |
| Comp. 4 | $39 \times 10^4$ | 59 | 12 | A | 5 | Slightly bluish |
| Comp. 5 | $32 \times 10^4$ | 0 | 0 | C | 2 | |

As is apparent from Table 1, the photographic light-sensitive material of the present invention is favorable in terms of the dust adhesion test and transparency.

While stirring a solution wherein 0.12 kg of gelatin and 0.05 kg of ammonium persulfate was added to 40 liter of water at the liquid temperature of 80° C., under a nitrogen atmosphere, a mixed solution of (A) 4.51 kg of n-butylacrylate, (B) 5.49 kg of styrene and (C) o.1 kg of acrylic acid was added spending one hour. Following this, the resulting mixture was stirred for 1.5 hours, and then, 1.25 kg of gelatin and 0.005 kg of ammonium persulfate were added thereto. After stirring for 1.5 hours, reaction was completed. Next, vapor was distilled for one hour so that the residual monomer was removed. Following this, the resulting mixture was chilled to the room temperature, and then, by the use of ammonia, its pH was regulated to 6.0. The resulting latex solution was diluted with water so that the density thereof was set at 20 wt %.

As described above, a mono-dispersed latex whose average particle size was 0.35μ and Tg was about 0° C. was obtained.

Synthesis of latex particles (conductive particle P1 of the present invention) having a conductive organic polymer on its surface In a reacting container equipped with a stirrer, a reflux chiller, a dropping flue and a nitrogen-introducing tube, 700 parts of water were poured. To aforesaid water, 100 parts of styrene sulfonic acid and maleic acid copolymer sodium salt (the polymerization mol ratio was that styrene sulfonic acid:maleic acid=3:1, Mw=5000) while stirring to form an aqueous solution. Through the above-mentioned nitrogen introducing tube, a nitrogen gas was introduced, causing inside the reacting container under nitrogen atmosphere. Concurrently with this, dissolved oxygen in an aqueous solution was removed. Following this, the temperature of the aqueous solution was raised to 80° C. To this aqueous solution, 90 parts of styrene, 10 parts of butyl acrylic acid and 100 parts of an aqueous potassium persulfate solution (the density was 1 wt %) were dropped. Under nitrogen gas reflux, polymerization reaction was conducted at 80° C. so that the objective conductive particles of the present invention were obtained.

Support 2

Sample preparation conditions were the same as in support 1 except that subbing coating solution B-2-2 was employed in place of subbing coating solution B-2-1.

| Subbing coating solution B-2-2 | |
| --- | --- |
| Copolymer latex solution composed of 40 wt % of butylacrylate, 20 wt % of styrene and 40 wt % of glycidyl acrylate (the solid portion was 30%) | 23 g |
| Conductive Dispersant P2 | 415 g |
| Polypropylene glycol (molecular weight was 450) | 0.00001 g |
| Water | 568 g |

Support 3

Sample preparation conditions were the same as in support 1 except that subbing coating solution B-2-3 was employed in place of subbing coating solution B-2-1.

| Subbing coating solution B-2-3 | |
| --- | --- |
| Copolymer latex solution composed of 40 wt % of butylacrylate, 20 wt % of styrene and 40 wt % of glycidyl acrylate (the solid portion was 30%) | 23 g |
| Conductive Dispersant P3 | 760 g |
| Polyethylene glycol (its molecular weight was 600) | 1.65 g |
| Water | 700 g |

Support 4

Sample preparation conditions were the same as in support 1 except that subbing coating solution B-2-4 was employed in place of subbing coating solution B-2-1.

| Subbing coating solution B-2-4 | |
| --- | --- |
| Copolymer latex solution composed of 40 wt % of butylacrylate, 20 wt % of styrene and 40 wt % of glycidyl acrylate (the solid portion was 30%) | 24 g |
| Conductive Dispersant P2 | 600 g |
| Polyethylene glycol (its molecular weight was 600) | 1.2 g |
| Water | 800 g |

Support 5

Sample preparation conditions were the same as in support 1 except that subbing coating solution B-2-5 was employed in place of subbing coating solution B-2-1.

| Subbing coating solution B-2-5 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P2 | 80 g |
| Polyvinyl alcohol (its molecular weight was 350) | 0.0001 g |
| Water | 700 g |

Support 6

Sample preparation conditions were the same as in support 1 except that subbing coating solution B-2-6 was employed in place of subbing coating solution B-2-1.

| Subbing coating solution B-2-6 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P4 | 62 g |
| Polyethylene glycol (its molecular weight was 600) | 0.00012 g |
| Water | 700 g |

Support 7

Sample preparation conditions were the same as in support 1 except that subbing coating solution B-2-7 was employed in place of subbing coating solution B-2-1.

| Subbing coating solution B-2-7 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P4 | 39 g |

-continued

| Subbing coating solution B-2-7 | |
| --- | --- |
| Polyethylene glycol (its molecular weight was 600) | 0.52 g |
| Water | 690 g |

Support 8

Sample preparation conditions were the same as in support 1 except that subbing coating solution B-2-8 was employed in place of subbing coating solution B-2-1.

| Subbing solution B-2-8 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P4 | 16 g |
| Polyethylene glycol (its molecular weight was 600) | 0.33 g |
| Water | 750 g |

Support 9

Sample preparation conditions were the same as in support 1 except that subbing coating solution B-2-9 was employed in place of subbing coating solution B-2-1.

| Subbing coating solution B-2-9 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P3 | 430 g |
| Polyethylene glycol (its molecular weight was 600)y | 0.0001 g |
| Water | 720 g |

Support 10

Sample preparation conditions were the same as in support 1 except that subbing coating solution B-2-10 was employed in place of subbing coating solution B-2-1.

| Subbing coating solution B-2-10 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P3 | 420 g |
| Polyethylene glycol (its molecular weight was 600) | 0.00015 g |
| Water | 730 g |

Support 11

Sample preparation conditions were the same as in support 1 except that subbing coating solution B-2-11 was employed in place of subbing coating solution B-2-1.

| Subbing coating solution B-2-11 | |
| --- | --- |
| Copolymer latex solution composed of 40 wt % of butylacrylate, 20 wt % of styrene and 40 wt % of glycidyl acrylate (the solid portion was 30%) | 27 g |
| Conductive Dispersant P2 | 700 g |
| Polyethylene glycol (its molecular weight was 600) | 1.6 g |
| Water | 800 g |

Support 12

Sample preparation conditions were the same as in support 1 except that subbing coating solution B-2-12 was employed in place of subbing coating solution B-2-1.

| Subbing coating solution B-2-12 | |
|---|---|
| Copolymer latex solution composed of 40 wt % of butylacrylate, 20 wt % of styrene and 40 wt % of glycidyl acrylate (the solid portion was 30%) | 23 g |
| Conductive Dispersant P3 | 620 g |
| Polyethylene glycol (its molecular weight was 600) | 1.55 g |
| Water | 690 g |

Support 13

Sample preparation conditions were the same as in support 1 except that subbing coating solution B-2-13 was employed in place of subbing coating solution B-2-1.

| Subbing coating solution B-2-13 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P2 | 82 g |
| Polyethylene glycol (its molecular weight was 600) | 0.17 g |
| Water | 690 g |

Support 14

Sample preparation conditions were the same as in support 1 except that subbing coating solution B-2-14 was employed in place of subbing coating solution B-2-1.

| Subbing coating solution B-2-14 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P3 | 82 g |
| Polyethylene glycol (its molecular weight was 600) | 0.00012 g |
| Water | 680 g |

Support 15

Sample preparation conditions were the same as in support 1 except that subbing coating solution B-2-15 was employed in place of subbing coating solution B-2-1.

| Subbing coating solution B-2-15 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P2 | 41 g |
| Polyethylene glycol (its molecular weight was 600) | 0.96 g |
| Water | 700 g |

Support 16

Sample preparation conditions were the same as in support 1 except that subbing coating solution B-2-16 was employed in place of subbing coating solution B-2-16

| Subbing coating solution B-2-16 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P2 | 83 g |
| Polyethylene glycol (its molecular weight was 600) | 0.48 g |
| Water | 700 g |

Support 17

Sample preparation conditions were the same as in support 1 except that subbing coating solution B-0-1 was employed in place of subbing coating solution B-2-1.

| Subbing coating solution B-0-1 | |
|---|---|
| Copolymer latex solution composed of 40 wt % of butylacrylate, 20 wt % of styrene and 40 wt % of glycidyl acrylate (the solid portion was 30%) Water was added to make 1 liter. | 270 g |

Support 18

Sample preparation conditions were the same as in support 1 except that subbing coating solution B-0-2 was employed in place of subbing coating solution B-2-1. Tin oxide powder containing solution contained in subbing coating solution B-0-2 is an aqueous ammonia solution containing 8 wt % of powder crushed in a ball mill wherein tin oxide in which 3% of antimony oxide was added was burned at 900° C. The average particle size of this powder was 0.5 μm, and the specific gravity was 6.9.

Preparation of the subbing coating solution was conducted in the same manner as in Example 1. However, a precipitant of tin oxide powder was observed in the coating solution container after film coating.

| Subbing coating solution B-0-2 | |
|---|---|
| Copolymer latex solution composed of 40 wt % of butylacrylate, 20 wt % of styrene and 40 wt % of glycidyl acrylate (the solid portion was 30%) | 27 g |
| Tin oxide powder solution | 90 g |
| Polyethylene glycol (its molecular weight was 600) | 1.3 g |
| Water | 800 g |

Support 19

Sample preparation conditions were the same as in support 1 except that subbing coating solution B-0-3 was employed in place of subbing coating solution B-2-1. The prepared film was slightly gray.

| Subbing coating solution B-0-3 | |
|---|---|
| Copolymer latex solution composed of 40 wt % of butylacrylate, 20 wt % of styrene and 40 wt % of glycidyl acrylate (the solid portion was 30%) | 27 g |
| Conductive Dispersant P3 | 45 g |
| Water | 750 g |

Support 20

Sample preparation conditions were the same as in support 1 except that subbing coating solution B-0-4 was employed in place of subbing coating solution B-2-1.

The prepared film was slightly gray.

| Subbing coating solution B-0-4 | |
|---|---|
| Copolymer latex solution composed of 40 wt % of butylacrylate, 20 wt % of styrene and 40 wt % of glycidyl acrylate (the solid portion was 30%) | 10 g |
| Conductive Dispersant P3 | 580 g |
| Polyethylene glycol (its molecular weight was 600) | 1.4 g |
| Water | 480 g |

On supports 1–20, the following emulsion layer was coated to prepare sample Nos. 1–20.
Emulsion coating
Preparation of Em-1
In the following manner, a tabular type silver bromide emulsion was prepared.

| A1: | Ossein gelatin | 24.2 g |
|---|---|---|
| | Water | 9657 ml |
| | HO—$(CH_2CH_2O)_n$—[$CH(CH_3)CH_2O]_{17}$—$(CH_2CH_2O)_mH$ (n + m = 5 to 7) (an aqueous methanol solution) | 1.20 ml |
| | Potassium bromide | 10.8 g |
| | 10% nitric acid | 160 ml |
| B1 | 2.5 N aqueous silver nitrate solution | 2825 ml |
| C1 | Potassium bromide | 841 g |
| | Water was added to make | 2825 ml |
| D1 | Ossein gelatin | 121 g |
| | Water | 2040 ml |
| | HO—$(CH_2CH_2O)_n$—[$CH(CH_3)CH_2O]_{17}$—$(CH_2CH_2O)_mH$ (n + m = 5 to 7) (an aqueous methanol solution) | 5.7 ml |
| E1 | An aqueous 1.75N potassium bromide solution | |

The following silver potential control amount.

At 35° C., using a mixture stirrer disclosed in Japanese Patent Publication Nos. 58288/1983 and 58289/1983, 475.0 ml of Solutions B1 and C1 were respectively added to Solution A1 by means of the double jet method spending 2.0 minutes for forming nuclei.

After stopping the addition of solutions B1 and C1, the temperature of Solution A1 was raised to 60° C. spending 60 minutes. The total amount of D1 was added. By means of 3% KOH, pH was regulated to 5.5. Following this, Solutions B1 and C1 were added again by means of a double jet method for 42 minutes at flow rate of 55.4 ml/min. Silver potential (which was measured by a silver ion selected electrode with "saturated silver—silver chloride" electrode as a comparative electrode) in the course of raising temperature from 35° C. to 60° C. and re-double jet addition by means of Solutions B1 and C1 were controlled to be +8 mv and +30 mv using Solution D1.

After addition, by means of 3% KOH, pH was regulated to 6.0, and immediately after that, the emulsion was subjected to desalting and washing. It was observed through an electronic microscope that ninety or more % of the total projected area of the silver halide grain in aforesaid seed emulsion was composed of a hexagonal tabular grain whose maximum adjoining side is 1.0 to 2.0, average thickness of aforesaid hexagonal tabular grain was 0.090 μm and the average grain size (in conversion to the diameter of circle) was 0.510 μm.

Successively, the temperature of this emulsion was raised to 53° C. Following this, a prescribed amount of spectral sensitizing dyes A and B were added thereto in a form of solid fine particle. Following this, an aqueous mixed solution of 4-hydroxy-6-methyl-1,3,3a,7-tetrazaindene (TAI), adenine, ammonium thiocyanate, chloro aurate and sodium thiosulfate and a dispersed solution of silver iodide fine particle emulsion and triphenyl phosphine selenide were added thereto. Aforesaid emulsion was subjected to ripening for 2 hours and 30 minutes. After ripening, an appropriate amount of TAI was added as a stabilizer.

The kind and the added amount (per mol of AgX) are shown below.

| Spectral sensitizing dye | |
|---|---|
| Anhydride of sodium 5,5'-dichloro-9-ethyl-3,3'-di-(3-sulfopropyl)oxacarbocyanine | 450 mg |

| Spectral sensitizer (B) | |
|---|---|
| Anhydride of sodium 5,5'-di-(buthoxycarbonyl)-1,1'-diethyl-3,3'-di(4-sulfobutyl)benzo-imidazolocarbo cyanine | 8 mg |
| 4-hydroxy-6-methyl-1,3,3a,7-tetrazaindene | 60 mg |
| Adenine | 15 mg |
| Sodium thiosulfate | 5.0 mg |
| Ammonium thiocyanate | 50 mg |
| Chloro aurate | 2.5 mg |
| Silver iodide fine particle emulsion (the average particle size was 0.05 μm) | equivalent to 5 mmol |
| Triphenyl phosphine selenide | 6.0 mg |
| Stabilizer (TAI) | 750 mg |

The solid fine particle type dispersant of the spectral sensitizing dye was prepared by a method disclosed in Japanese Patent Application No. 99437/1992.

Namely, it was obtained by adding a prescribed amount of spectral sensitizing dye in water whose temperature was regulated to 27° C. and stirring it with a high speed stirrer (dissolver) at 3,500 rpm for 30–120 minutes.

The dispersed solution of the above-mentioned selenium sensitizer was prepared as follows. Namely, 120 g of triphenylphosphine solenoid was added to 30 kg of ethylacetic acid, and then stirred and completely dissolved. In addition, 3.8 kg of photographic gelatin was dissolved in 38 kg of pure water, to which 93 g of an aqueous 25 wt % of sodium dodecylbenzene sulfonic acid was added. Next, the above-mentioned two solutions were mixed and dissolved for 30 minutes with a high speed stirrer type disperser having a diameter of 10 cm at dispersion wing circumferential speed of 40 m/sec. at 50° C. Immediately after that, under evacuated condition, ethyl acetic acid was removed from the dispersed mixture while stirring until the residual density becomes 0.3 wt % or less. A part of dispersed solution obtained in the above-mentioned manner was sampled and used for the above-mentioned experiment.

Using a seed emulsion Em-1 and 4 kinds of solutions described below, tabular silver bromoidide emulsion Em-2 was prepared.

| A2: | Ossein gelatin | 19.4 g |
| --- | --- | --- |
| | HO—(CH$_2$CH$_2$O)$_n$—[CH(CH$_3$)CH$_2$O]$_{1.7}$—(CH$_2$CH$_2$O)$_m$H (n + m = 5–7) | 2.00 ml |
| | (An aqueous 10% methanol solution) | |
| | Potassium iodide | 7.00 g |
| | Em-1 (Seed emulsion) | Equivalent to 1.55 mol |
| | Water was added to make 2800 ml in total. | |
| B2 | Potassium bromide | 1493 g |
| | Water was added to make 3585 ml. | |
| C2 | Silver nitrate | 2131 g |
| | Water was added to make 3585 ml. | |
| D2 | Fine particle emulsion composed of 3 wt % of gelatin and silver iodide particle (the average particle size was 0.05 μm) (*) | Equivalent to 0.028 mol |

*To 6.64 liter of 5.0 wt. % aqueous gelatin solution containing 0.06 mol of potassium iodide, 2 liters of aqueous solutions respectively containing 7.06 mol of silver nitrate and containing 7.06 mol of potassium iodide were added spending 10 minutes. pH during forming fine particle was controlled to 2.0 temperature was controlled to 40° C. After forming particles, pH was regulated to 6.0 using an aqueous sodium carbonate solution.

In a reaction container, Solution A2 was vigorously stirred while keeping its temperature at 55° C. To the solution, half amount of Solutions B2 and C2 were respectively added spending 35 minutes by means of the double jet method. In the meanwhile, pH was regulated to 5.8. After pH was regulated to 8.8 by means of a 1% KOH, a part of Solutions B2 and C2 and the whole amount of Solution D2 were added by the double jet method. After pH was regulated to 6.0 by means of 0.5% citric acid, the remaining amount of Solutions B2 and C2 were added spending 25 minutes by means of the double jet method. In the meanwhile, pAg was kept at 8.9 throughout the process. Here, the addition speed of Solutions B2 and C2 were respectively changed function-wisely against time in order to optimize with the critical growth speed. Namely, they were added appropriately for preventing the occurrence of small grains other than seed grains in growing and for preventing multi-dispersed due to Ostwald's ripening.

After addition, the mixture was subjected to desalting, washing and re-dispersing in the same manner as in Em-1. After re-dispersion, pH and pAg were respectively regulated to 5.80 and 8.2 at 40° C. When the resulting silver halide emulsion was observed by an electron microscope, it was composed of tabular silver halide grains whose average grain size was 0.91 μm, average thickness was 0.23μ, average aspect ratio was about 4.0 and the range of the grain distribution was 20.5%.

Successively, the temperature of this emulsion was raised to 47° C. Following this, a prescribed amount of silver iodide fine grain emulsion and spectral sensitizers A and B were added thereto as a dispersed material of the solid fine grain. Then, an aqueous mixed solution of adenine, ammonium thiocyanate, chloro aurate and sodium thiosulfate and a dispersed solution of triphenyl phosphine solenoid were added. The mixture was subjected to ripening for 2 hours and 30 minutes in total. After ripening, as a stabilizer, an appropriate amount of 4-hydroxy-6-methyl1,3,3a,7-tetrazaindene (TAI) was added.

Kinds and added amount (per mol of AgX) of spectral sensitizing dyes and other additives.

| Spectral sensitizer (A) | |
| --- | --- |
| Anhydride of sodium 5,5'-dichloro-9-ethyl-3,3'-di-(3-sulfopropyl)oxycarbocyanine salt | 390 mg |

| Spectral sensitizer (B) | |
| --- | --- |
| Anhydride of sodium 5,5'-di-(buthoxycarbonyl)-1,1'-diethyl-3,3'-di-(4-sulfobutyl)benzoimidazolo carbocianine | 4 mg |
| Adenine | 10 mg |
| Sodium thiocyanate | 3.3 mg |
| Ammonium thiocyanate | 50 mg |
| Chloro aurate | 2.0 mg |
| Silver iodide fine grain emulsion | for 5 mmol |
| Triphenylphosphine solenoid | 4.0 mg |
| Stabilizer (TAI) | 750 mg |

Incidentally, a silver iodide fine grain emulsion is referred to as a fine grain emulsion composed of 3 wt % of gelatin and silver iodide grains (the average grain size is 0.05μ)

The solid fine particle type dispersant for the spectral sensitizing dye was prepared in accordance with a method described in Japanese Patent Application No. 99437/1992.

Namely, a prescribed amount of spectral sensitizing dye was added to water whose temperature was regulated to 27° C., and the resulting mixture was stirred for 30–120 minutes at 3.500 rpm by means of the high speed stirrer (dissolver).

The dispersed solution of the above-mentioned selenium sensitizer was prepared as follows. Namely, 120 g of triphenylphosphine solenoid was added to 30 kg of ethylacetic acid, and then stirred and completely dissolved. In addition, 3.8 kg of photographic gelatin was dissolved in 38 kg of pure water, to which 93 g of an aqueous 25 wt % of sodium dodecylbenzene sulfonic acid was added. Next, the above-mentioned two solutions were mixed and dissolved for 30 minutes with a high speed stirrer type disperser having a diameter of 10 cm at dispersion wing circumferential speed of 40 m/sec. at 50° C. Immediately after that, under evacuated condition, ethyl acetic acid was removed from the dispersed mixture while stirring until the residual density becomes 0.3 wt % or less. A part of dispersed solution obtained in the above-mentioned manner was sampled and used for the above-mentioned experiment.

Next, a mixed emulsion containing emulsions Em-1 and Em-2 subjected to the above-mentioned sensitization by 60%:40% was prepared. Further, additives described below were also added thereto for preparing an emulsion coating solution. Concurrently with this, a coating solution for the protective layer and a cross-over cut layer were also prepared.

Preparation of a sample

Next, on both sides of a support prepared in advance, a cross-over cut layer, an emulsion layer, an intermediate layer and a protective layer described below were uniformly coated and dried so that Sample 1 was prepared. In this occasion, the added amount of silver per one side of each sample was 1.8 g/m$^2$, the amount of gelatin was 0.4 g/m$^2$ for the protective layer, t0.4 g/m$^2$ for the intermediate layer, 1.5 g/m$^2$ and 0.2 g/m$^2$ for he cross-over cut layer.

| First layer (The cross-over cut layer) | |
|---|---|
| Solid fine particle dispersed dye (AH) | 180 mg/m$^2$ |
| Gelatin | 0.2 g/m$^2$ |
| Sodium dodecylbenzene sulfonic acid | 5 mg/m$^2$ |
| Compound (I) | 5 mg/m$^2$ |
| Latex (L) | 0.2 g/m$^2$ |
| Sodium 2,4-dichloro-6-hydroxy-1,3,5-triazine salt | 5 mg/m$^2$ |
| Colloidal silica (the average particle size was 0.014 μm) | 10 mg/m$^2$ |
| Hardener (A) | 2 mg/m$^2$ |

Second layer (The emulsion layer)

To the emulsion obtained in the above-mentioned manner, the following additives were added.

| | |
|---|---|
| Compound (G) | 0.5 mg/m$^2$ |
| 2,6-bis(hydroxyamino)-4-diethylamino-1,3,5-triazine | 5 mg/m$^2$ |
| t-butyl-catecol | 130 mg/m$^2$ |
| Polyvinyl pyrrolidone (the molecular weight was 10,000) | 35 mg/m$^2$ |
| Styrene-maleic acid anhydride copolymer | 80 mg/m$^2$ |
| Sodium polystyrene sulfonic acid | 80 mg/m$^2$ |
| Trimethylol propane | 350 mg/m$^2$ |
| Diethylene glycol | 50 mg/m$^2$ |
| Nitrophenyl-triphenyl-phosphonium chloride | 20 mg/m$^2$ |
| Ammonium 1,3-dihydroxybenzene-4-sulfonic acid | 500 mg/m$^2$ |
| Sodium 2-mercaptobenzimidazole-5-sulfonic acid | 5 mg/m$^2$ |
| Compound (H) | 0.5 mg/m$^2$ |
| n-C$_4$H$_9$OCH$_2$CH(OPH)CH$_2$N(CH$_2$COOH)$_2$ | 350 mg/m$^2$ |
| Compound (M) | 5 mg/m$^2$ |
| Compound (N) | 5 mg/m$^2$ |
| Colloidal silica | 0.5 g/m$^2$ |
| Latex (L) | 0.2 g/m$^2$ |
| Dextrane (the average molecular weight was 1000) | 0.2 g/m$^2$ |
| Compound (P) | 0.2 g/m$^2$ |
| Compound (Q) | 0.2 g/m$^2$ |

| Third layer (The intermediate layer) | |
|---|---|
| Gelatin | 10 mg/m$^2$ |
| Sodium 2,4-dichloro-6-hydroxy-1,3,5-triazine salt | 5 mg/m$^2$ |
| Bis-vinyl sulfonylmethylether | 18 mg/m$^2$ |
| Latex (L) | 0.05 g/m$^2$ |

-continued

| Third layer (The intermediate layer) | |
|---|---|
| Sodium polyacrylic acid | 10 mg/m$^2$ |
| Compound (S-1) | 3 mg/m$^2$ |
| Compound (K) | 5 mg/m$^2$ |
| Hardener (B) | 1 mg/m$^2$ |

| Fourth layer (The protective layer) | |
|---|---|
| Gelatin | 0.4 g/m$^2$ |
| Matting agent composed of polymethylmethacrylate | 50 mg/m$^2$ |
| Formaldehyde | 10 mg/m$^2$ |
| Sodium 2,4-dichloro-6-hydroxy-1,3,5-triazine salt | 5 mg/m$^2$ |
| Bis(vinyl sulfonylmethyl)ether | 18 mg/m$^2$ |
| Latex (L) | 0.1 g/m$^2$ |
| Polyacrylic amide (the average molecular weight was 10000) | 0.05 g/m$^2$ |
| Sodium polyacrylic acid | 20 mg/m$^2$ |
| Polysiloxane (S1) | 20 mg/m$^2$ |
| Compound (I) | 12 mg/m$^2$ |
| Compound (J) | 2 mg/m$^2$ |
| Compound (S-1) | 7 mg/m$^2$ |
| Compound (K) | 15 mg/m$^2$ |
| Compound (O) | 50 mg/m$^2$ |
| Compound (S-2) | 5 mg/m$^2$ |
| C$_9$F$_{19}$—O—(CH$_2$CH$_2$O)$_{11}$—H | 3 mg/m$^2$ |
| C$_8$F$_{17}$SO$_2$N(C$_3$H$_7$)(CH$_2$CH$_2$O)$_{15}$—H | 2 mg/m$^2$ |
| C$_8$F$_{17}$SO$_2$N(C$_3$H$_7$)(CH$_2$CH$_2$O)$_4$—(CH$_2$)$_4$SO$_3$Na | 1 mg/m$^2$ |
| Hardener (B) | 1.5 mg/m$^2$ |

Incidentally, the added amount of materials are for one side. Silver amount coated was 1.3 g/m$^2$ for one side.

Compounds used are as follows.

Compound (G)

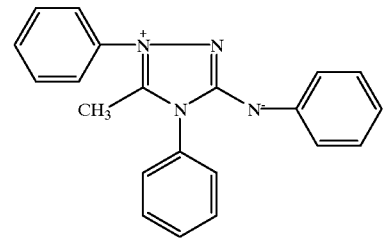

Compound (H)

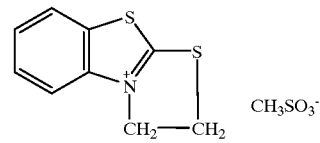

Compound (I)

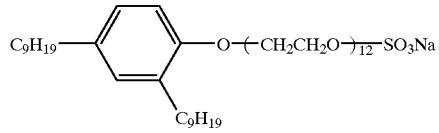

Compound (J)

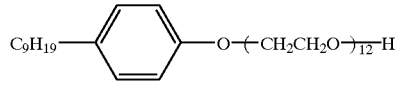

Compound (K)

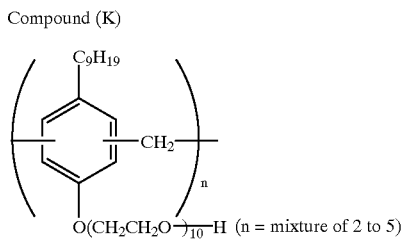

Compound (S-1)

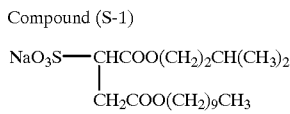

Compound (S-2)

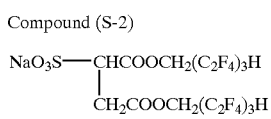

Latex (L)

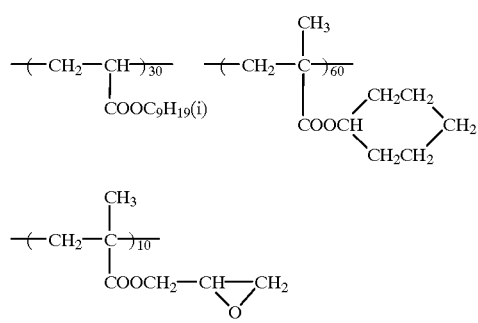

Polysiloxane (S1)

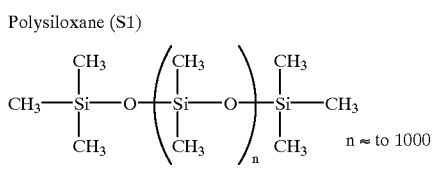

Solid fine particle dispersed dye (AH)

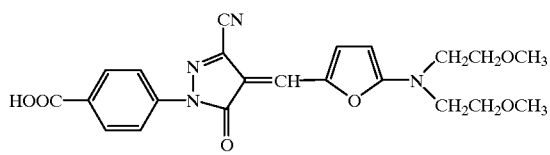

Compound (O)

$C_{11}H_{23}CONH(CH_2CH_2O)_5H$

Compound (M)

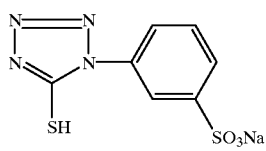

Compound (N)

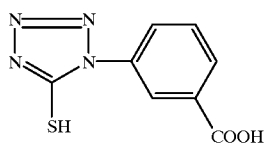

Compound (A)

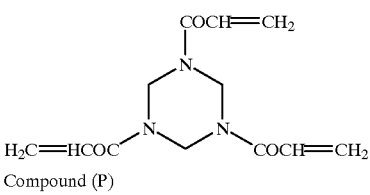

Compound (P)

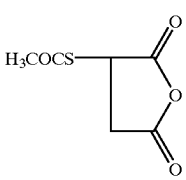

Compound (Q)

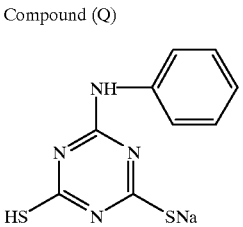

The absolute value measurement method of impedance

When impedance was measured, Precision LCR meter HP4284A and HP16451 produced by Yokogawa Yeulett Packado (hereinafter, referred to as YHP) were combined to be used.

Under atmosphere of 23° C. and 20% RH, the absolute value of the impedance of the film material was measured by means of a cavity method. With regard to the measurement of the cavity method, see an electrode un-contact method described in the operation manual (the parts number was 16451-97000, printed in December, 1989) of HP16451B. Using an electrode A wherein the diameter of the main electrode was 3.8 cm, the sample was cut to a square of 5.5×5.5 cm. The dispersion layer of the conductive particles were turned upward and measured.

Manufacturing a fluorescent sensitizing paper

Phosphor $Gd_2O_2S$: Tb (average particle size: 1.8 μm) 200 g
Binder polyurethane containing thermoplastic elaster
[Demolac TPKL-5-2625 the solid portion was 40%
(Produced by Sumitomo Bayer Urethane Inc.] 20 g
Nitrocellulose (the slaking degree was 11.5%) 2 g To the above, methylethylketone solvent was added. The resulting mixture was dispersed by means of a propeller type mixer for preparing a coating solution for forming a phosphor layer having viscosity of 25 ps (25° C.).

Separately, as a coating solution for forming a subbing layer, 90 g of soft acrylic resin solid portion and 50 g of nitrocellulose were added, and then, dispersed and mixed so that a dispersed solution having viscosity of 3–6 ps (25° C.) was prepared.

Polyethylene terephthalate base (support) whose thickness was 250 μm wherein titanium dioxide has been kneaded was placed horizontally on a glass plate, and the above-mentioned coating solution for forming a subbing layer was uniformly coated on a support using a doctor blade. Following this, the temperature was gradually raised from 25° C. to 100° C. so that a subbing layer was formed on a support. The thickness of the dried layer was 15 μm.

On thereof, a 240 μm thickness coating solution for forming a phosphor layer was uniformly coated and dried by means of a doctor blade, and then, subjected to compression.

For compression, a calendar roller was used, wherein the pressure was 800 kgw/cm$^2$ and the temperature was 80° C. After the compression, a 3 μm thickness transparent protective layer was formed by means of a method described in Example 1 of Japanese Patent O.P.I. Publication No. 75097/1994.

As above, a fluorescent sensitizing paper composed of a support, a subbing layer, a phosphor layer and a transparent protective layer was manufactured.

Valuation of Sample

Evaluation of adhesion of sludge onto a light-sensitive material

A 35.6×35.6 cm sized sample 17 was sandwiched by the above-mentioned fluorescent sensitizing paper. X ray was irradiated thereto in a manner that the density after photographic processing becomes about 1.0. Following this, 200 sheets of the same sample was continuously processed at the processing temperature of 35° C. using an SRX-503 automatic processor which was so modified that the processing time becomes as follow and an SR-DF processing solution. In this occasion, the amount of replenishing was 250 ml per 1 m$^2$.

Next, each sample was developed in the same manner. Whether there is sludge on the surface of the light-sensitive material after being processed was evaluated under five criteria:

5: No sludge is adhered.

4: When viewed with a loupe, it can be understood that sludge is adhered partially.

3: When viewed with a loupe, it can be understood that sludge is adhered entirely.

2: When viewed visually, it can be understood that sludge is adhered partially.

1: When viewed visually, it can be understood that sludge is adhered entirely.

Next, the processing solution was replaced with a new solution. While the amount of replenishing was set to be 210 ml per 1 m$^2$, 200 sheets of Sample 17 was processed in the same manner, and successively each sample was developed and evaluated.

In the same manner, evaluation was continued when the replenishing amount is 190 ml and when the replenishing amount is 125 ml.

Table 2 shows the difference of evaluation level between each Sample and sample 17 when the amount of replenishing was changed as described above.

| Developing time |
| --- |
| Developing time: 4 seconds |
| Fixing time: 3.1 seconds |
| Washing time: 2 seconds |
| Washing – drying time (squeeze): 1.6 seconds |
| Drying time: 4.3 seconds |
| The total processing time: 15 seconds |

TABLE 2

| Sample No. | Impedance $|Z|$ (20 Hz:Ω) | Conductive particle Added amount (vol %) | Difference of the amount of sludge with Sample 17 Replenishing amount (ml/m$^2$) | | | | Remarks |
| --- | --- | --- | --- | --- | --- | --- | --- |
| | | | 250 | 210 | 190 | 125 | |
| 1 | 255 × 10$^4$ | 40 | 0 | 0 | 3 | 4 | |
| 2 | 290 × 10$^4$ | 40 | 0 | 0 | 3 | 4 | |
| 3 | 135 × 10$^4$ | 50 | 0 | 0 | 3 | 3.5 | |
| 4 | 128 × 10$^4$ | 45 | 0 | 0 | 3 | 3.5 | |
| 5 | 100 × 10$^4$ | 10 | 0 | 0 | 3 | 4 | |
| 6 | 98 × 10$^4$ | 8 | 0 | 0 | 3 | 4 | |
| 7 | 295 × 10$^4$ | 5 | 0 | 0 | 3 | 4 | |
| 8 | 110 × 10$^4$ | 2 | 0 | 0 | 3 | 4 | |
| 9 | 90 × 10$^4$ | 37 | 0 | 0 | 3 | 4 | |
| 10 | 85 × 10$^4$ | 37 | 0 | 0 | 3 | 4 | |
| 11 | 45 × 10$^4$ | 45 | 0 | 0 | 3 | 3.5 | |
| 12 | 51 × 10$^4$ | 50 | 0 | 0 | 3 | 3.5 | |
| 13 | 65 × 10$^4$ | 10 | 0 | 0 | 3 | 4 | |
| 14 | 55 × 10$^4$ | 10 | 0 | 0 | 3 | 3.5 | |
| 15 | 70 × 10$^4$ | 5 | 0 | 0 | 3 | 4 | |
| 16 | 45 × 10$^4$ | 10 | 0 | 0 | 3 | 4 | |
| 17 | 30 × 10$^4$ | 0 | — | — | — | — | |
| 18 | 36 × 10$^4$ | 10 | 0 | 0 | 0 | 0 | |
| 19 | 34 × 10$^4$ | 5 | 0 | 0 | 0 | 0.5 | Slightly bluish |
| 20 | 39 × 10$^4$ | 59 | 0 | 0 | 0 | 0 | Slightly bluish |

As obvious from Table 2, when the impedance of the light-sensitive material is 4×10$^5$ Ω, effect is selectively exerted when the amount of reoplenishment is not greater than 200 ml.

There is little adhesion of sludge to the light-sensitive material caused by making the impedance of the light-sensitive material not greater than 4×10$^5$ Ω.

What is claimed is:

1. An anti-static-treated film material comprising an electro-conductive layer on a plastic material, wherein the electro-conductive layer comprises metal oxide particles in an amount of 1 to 50 vol. % with respect to said electro-conductive layer and polymer particles having an average particle diameter of 0.01 to 5 μm, and the absolute value of impedance of said film material is between 8×10$^5$ and 1×10$^{20}$ Ω at 20 Hz.

2. The anti-static-treated film material of claim 1 wherein the particle diameter of the metal oxide particles is not larger than 1 μm.

3. The anti-static-treated film material of claim 1 wherein the film is transparent.

4. The anti-static-treated film material of claim 1 wherein the absolute value of impedance of said film material is between 1×10$^6$ and 10$^{20}$ Ω at 20 Hz.

5. The anti-static-treated film material of claim 1 wherein the metal oxide particles are colloidal SnO$_2$, the absolute value of impedance of said film material is between 1×10$^6$ and 1×10$^{20}$ Ω at 20 Hz, the polymer particles are structured by a polymer which is insoluble in water, and the film is transparent.

6. The anti-static-treated film material of claim 1 wherein the metal oxide particles are colloidal SnO$_2$.

7. The anti-static-treated film material of claim 1 wherein said metal oxide particles are an oxide containing a metal element manufactured under temperatures not higher than 400° C.

8. The anti-static-treated film material of claim 1 wherein the polymer particles are structured by a polymer which is insoluble in water.

9. The anti-static-treated film material of claim 1 wherein the dry thickness of said electro-conductive layer is 1.3 or more times as thick as the average diameter of the polymer particles.

10. The anti-static-treated film material of claim 1 wherein the plastic film material to be anti-static treated comprises as its main ingredient syndiotactic polystyrene.

11. The anti-static-treated film material of claim 1 wherein the electro-conductive layer comprises an organic compound, of which Tg or fusing temperature is 50° C. or below.

12. The anti-static-treated film material of claim 11 wherein an amount of the organic compound is between 0.001 and 10 vol %, with respect to said electro-conductive layer.

13. A silver halide light-sensitive photographic material having a support made of the anti-static-treated material of claim 1.

14. The anti-static-treated film material of claim 1 wherein the material comprises an electro-conductive layer on both sides of the plastic film material.

15. The anti-static-treated film material of claim 1 wherein the content of metal oxide particles per unit volume in the electro-conductive layer is not more than 37 vol %.

16. The anti-static-treated film material of claim 1 wherein the content of metal oxide particles per unit volume in the electro-conductive layer is not more than 20 vol %.

17. The anti-static-treated film material of claim 1 wherein the content of the metal oxide particles per unit volume in the electro-conductive layer is not less than 5 vol %.

18. The anti-static-treated film material of claim 1 wherein the electro-conductive layer is formed by coating a composition which is produced by mixing a metal oxide sol of said metal oxide particles with the polymer particles.

19. The anti-static-treated film material of claim 12, wherein the organic compound is ethylene glycol, propylene glycol, 1,1,1-trimethylol propane, polyethylene glycol, or polypropylene glycol.

20. The anti-static-treated film material of claim 18, wherein the electro-conductive layer comprises the metal particles having conductivity of between $10^{-1}$ and $10^9$ Ω.cm and particle size of 0.001 to 0.5 μm in an amount of 10 to 40 vol % based on the electro-conductive layer, and organic compound having Tg or fusing temperature of not less than 50° C. of ethylene glycol, propylene glycol, 1,1,1-trimethylol propane, polyethylene glycol, or polypropylene glycol.

* * * * *